(12) United States Patent
Tomita et al.

(10) Patent No.: US 7,613,149 B2
(45) Date of Patent: Nov. 3, 2009

(54) MOBILE COMMUNICATION SYSTEM AND METHOD OF DATA DISPERSION IN SAID SYSTEM

(75) Inventors: Tetsuo Tomita, Kawasaki (JP); Toshiyuki Yokosaka, Kawasaki (JP); Akira Fujishima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 503 days.

(21) Appl. No.: 11/143,924

(22) Filed: Jun. 2, 2005

(65) Prior Publication Data

US 2005/0249160 A1 Nov. 10, 2005

Related U.S. Application Data

(63) Continuation of application No. PCT/JP03/04594, filed on Apr. 11, 2003.

(51) Int. Cl.
*H04W 4/00* (2006.01)
*H04L 12/56* (2006.01)

(52) U.S. Cl. .................. 370/331; 370/338; 370/401

(58) Field of Classification Search .............. None
See application file for complete search history.

(56) References Cited

U.S. PATENT DOCUMENTS

| | | | | |
|---|---|---|---|---|
| 6,230,013 | B1* | 5/2001 | Wallentin et al. ............ | 455/436 |
| 6,834,044 | B2* | 12/2004 | Sugirtharaj et al. .......... | 370/328 |
| 6,941,132 | B2* | 9/2005 | Van Lieshout et al. ...... | 455/418 |
| 2001/0037401 | A1 | 11/2001 | Soumiya et al. | |
| 2002/0105935 | A1* | 8/2002 | Miya ........................... | 370/342 |
| 2004/0071108 | A1* | 4/2004 | Wigell et al. ................ | 370/328 |

FOREIGN PATENT DOCUMENTS

| | | |
|---|---|---|
| EP | 1 155 580 | 11/2001 |
| JP | 5-63635 | 3/1993 |
| JP | 6-164477 | 6/1994 |
| JP | 8-205235 | 8/1996 |
| JP | 8-307930 | 11/1996 |
| JP | 9-163435 | 6/1997 |
| JP | 9-298575 | 11/1997 |
| JP | 2000-216815 | 8/2000 |
| JP | 2000-299886 | 10/2000 |
| JP | 2001-60956 | 3/2001 |
| JP | 2001-320420 | 11/2001 |
| JP | 2002-64544 | 2/2002 |
| JP | 2002-538691 | 11/2002 |

OTHER PUBLICATIONS

International Search Report dated Jul. 22, 2003.

* cited by examiner

*Primary Examiner*—Michael J Moore, Jr.
*Assistant Examiner*—Marcus R Smith
(74) *Attorney, Agent, or Firm*—Katten Muchin Rosenman LLP

(57) ABSTRACT

In a mobile communication system, which has a plurality of radio network controllers and a number of radio base stations connected to each of the radio network controllers, for sending and receiving user data between a host network and mobile stations via the radio network controllers and radio base stations, a plurality of transmission paths that pass through one or more radio network controllers are set up between a base station, which sends and receives radio signals to and from a mobile station, and the host network. When data is being sent and received using one transmission path from the host network to a base station through a radio network controller, traffic conditions on this transmission path are monitored. When traffic has increased, the user data is dispersed by being passed through a plurality of transmission paths.

14 Claims, 20 Drawing Sheets

MOBILE COMMUNICATION SYSTEM AND METHOD OF DATA DISPERSION IN SAID SYSTEM

CROSS-REFERENCE TO RELATED APPLICATION

This application is a continuation of International Application PCT/JP03/04594 filed on Apr. 11, 2003, pending at the time of filing this continuation application, the contents of which are herein wholly incorporated by reference.

BACKGROUND OF THE INVENTION

This invention relates to a mobile communication system and to a method of dispersing data in this system. More particularly, the invention relates to a mobile communication system, which has a plurality of radio network controllers (RNC) and a number of radio base stations (Node B) connected to each of the radio network controllers, for sending and receiving user data between a host network (CN) and mobile stations (UE) via the radio network controllers and radio base stations, and to a method of dispersing data in this system.

The commercialization of CDMA (Code Division Multiple Access) communication systems is proceeding at a rapid pace. Commercial service for wideband CDMA (W-CDMA) systems, which are for exchanging not only voice and still pictures that form the principal service at the present time but also large quantities of data such as moving pictures, also has begun. The specifications for these have been set by the 3GPP ($3^{rd}$ Generation Partnership Project), which is an organization for standardizing $3^{rd}$ generation mobile communication systems. The study of various specifications and their addition to existing specifications is continuing with the goal of attaining systems that can implement services having a quality higher presently available.

FIG. 18 is a diagram showing an overview of a W-CDMA system that is compliant with current 3GPP specifications. The system comprises nodes of four types, namely a host network (CN: Core Network) 100, radio control networks (RNC) 101_0 to 101_n, radio base stations (Node B) 102_0 to 102_n, and a mobile station (UE: User Equipment) 103. The nodes 100, 101_0 to 101_n and 102_0 to 102_n are physically connected (in a wired section) by ATM (Asynchronous Transfer Mode) transmission paths and IP (Internet Protocol) transmission paths, etc. The radio base stations 102_0 to 102_n are connected to the mobile station 103 by radio signals (in a wireless section). Iu represents an interface between the radio network controllers 101_0 to 101_n and the core network 100, Iur an interface between the radio network controllers 101_0 to 101_n, Iub an interface between the radio network controllers 101_0 to 101_n and radio base stations 102_0 to 102_n, and Uu an interface between the radio base stations 102_0 to 102_n and mobile station 103.

FIG. 19 is an explanatory view illustrating the flow of user data at the time of communication. User data is transmitted from the CN 100, which accommodates a switch, server and database, etc., to the RNC (SRNC: Serving RNC) 101_0 that controls UEs 103_0, 103_1, via the Iu line. In a case where a UE resides in a cell 104_1 under the control of SRNC 101_1 (i.e., in the case of UE 103_0), the user data is transmitted from SRNC 101_0 to Node B 102_1, which accommodates this cell, via the Iub line and thence is transmitted to UE 103_0 via the Uu interface (see the bold solid line in FIG. 19). On the other hand, if the UE resides in a cell 104_5 under the control of an RNC (DRNC: Drift RNC) 101_1 other than the SRNC 101_0 (i.e., in the case of UE 103_1) owing to movement of the UE, then the user data is transmitted from SRNC 101_0 to DRNC 101_1 via the Iur line, from DRNC 101_1 to Node B 102_5, which accommodates this cell, via the Iub line, and thence to the UE 103_1 via the Uu interface (see the bold dashed line in FIG. 19). It is assumed that the RNC that controls the UE 103_1 is SRNC even though this UE moves.

With high-speed data communication such as HSDPA (High Speed Data Packet Access) covered extensively as next-generation communication technology, the quantity of user data is increased greatly. As a result, the band required in the transmission paths of the interfaces Iu, Iur, Iub, etc., is widened greatly and it is necessary to improve the accommodating capability and processing capability at each node by a wide margin.

Further, in a mobile communication system, the conditions of use. (traffic) fluctuate depending upon the time of day and location. If the traffic becomes unbalanced, a wider band and greater processing capability become necessary at locations where traffic concentrates in comparison with a situation in which there is no imbalance.

If such a marked increase in band and processing capability owing to higher speed of communication and marked increase in band and processing capability owing to traffic imbalance overlap, the load imposed upon the system will fluctuate violently. This can lead to system instability and degrade the efficiency of utilization of the entire system, thereby diminishing cost performance greatly. FIG. 20 is a diagram useful in describing the influence of traffic fluctuation upon the system. The band used on each transmission path is indicated by the thickness of the corresponding transmission path. In FIG. 20, traffic concentrates at SRNC 101_0, surplus band remaining at SRNC 101_0 diminishes and processing capability becomes inadequate. At DRNC 101_1, however, traffic is sparse, there is an abundance of surplus band and processing capability is adequate.

An approach that may be adopted in such case is to employ a design that furnishes the band and processing capability with latitude so as to be capable of dealing with large fluctuations in load. However, it is predicted that this will lead to an enormous increase in the size of circuitry, the size of the system and cost of development, etc. Cost performance declines greatly. For this reason, there is prior art so adapted as to disperse traffic when traffic becomes concentrated (Patent References 1 to 5). According to Patent Reference 1, which deals with a mobile communication system constituted by a plurality of radio base stations, a mobile telephone exchange calculates the call-channel rate of use of each mobile station from the number of call channels used by all radio base stations and the number of call channels used by each base station and, when the call-channel rate of use of a prescribed base station exceeds a threshold value, reduces traffic by lowering the radio transmission outputs of this radio base station. According to Patent Reference 2, when the call-channel rate of use of a base station that is the destination of movement at the time of handover is greater than a threshold value, handover to this radio base station is restricted. According to Patent Reference 3, a radio base station itself monitors the state of traffic concentration and, when concentration of traffic is detected, lowers the control-channel signal level, thereby reducing the size of the communication area and lowering traffic. According to Patent Reference 4, which deals with a digital mobile communication system in which communication between terminal stations that belong different repeater stations is performed via a single exchange, the traffic load is dispersed without control signals, which are sent and received between the repeater stations and exchange, becoming concentrated in a specific line. According to Patent Reference 5, areas (sub-areas) in which traffic density is low are consolidated into one radio area, and communication of incoming and outgoing calls of each area is performed by a single base station apparatus, thereby improving the efficiency of utilization of lines connected to a public digital network.

However, in none of these examples of the prior art is user data, which is sent and received between a core network and a prescribed radio base station, dispersed to a plurality of transmission paths between the core network and the prescribed radio base station upon taking transmission-path traffic into account. Further, none of these examples of the prior art reduce traffic on a transmission path or at a node where traffic has concentrated and continue communication upon allocating the amount of reduction to transmission paths or nodes where traffic has not concentrated. Further, none of these examples of the prior art contemplate dispersing traffic upon regarding amount of user data as traffic.

Patent Reference 1: Japanese Patent Application Laid-Open No. 5-63635
Patent Reference 2: Japanese Patent Application Laid-Open No. 6-164477
Patent Reference 3: Japanese Patent Application Laid-Open No. 9-163435
Patent Reference 4: Japanese Patent Application Laid-Open No. 8-205235
Patent Reference 5: Japanese Patent Application Laid-Open No. 8-307930

SUMMARY OF THE INVENTION

An object of the present invention is to maintain system stability, raise the efficiency of utilization of the entire system and improve cost performance by dispersing and transmitting user data using a plurality of transmission paths when traffic between a core network and a radio base station increases.

Another object of the present invention is to so arrange it that traffic on a transmission path or at a node where traffic has concentrated can be reduced and the amount of reduction can be dispersed to transmission paths or nodes where traffic has not concentrated, thereby enabling communication to continue.

Another object of the present invention is to make retransmission control possible even in a case where user data is transmitted upon being dispersed by a plurality of transmission paths.

A first aspect of the present invention is a mobile communication system, which has a plurality of radio network controllers and a number of radio base stations connected to each of the radio network controllers, for sending and receiving user data between a host network and mobile stations via the radio network controllers and radio base stations, and to a method of dispersing data in this system. According to the first aspect of the present invention, a plurality of transmission paths that pass through one or more radio network controllers are set up between a base station, which sends and receives radio signals to and from a mobile station, and the host network. When data is being sent and received using one transmission path from the host network to a base station through a radio network controller, traffic conditions on this transmission path are monitored. When traffic has increased, the user data is dispersed by being passed through a plurality of transmission paths. By adopting this expedient, system stability can be maintained, the efficiency of utilization of the entire system can be enhanced and cost performance improved. It should be noted that separating means for separating user data and a call control signal is provided so that dispersion processing is executed with regard to user data.

In a second aspect of the present invention, when traffic increases and a request-source node requests that user data be dispersed and transmitted on a plurality of transmission paths, the node selects a call for which dispersion is desired and requests that the radio network controller that is controlling this call distribute the call. In this case, the request-source node incorporates amount of band of a transmission path on which dispersion is desired in a dispersion request and notifies the radio network controller of the request. The radio network controller exercises control in such a manner that the user data of the amount of band of which it has been notified is dispersed and transmitted on another transmission path. If this expedient is adopted, traffic on a transmission path or at a node at which traffic has concentrated is reduced and the amount of reduction is allocated to transmission paths or nodes where traffic has not concentrated, thereby enabling communication to continue.

In a third aspect of the present invention, when user data is dispersed and transmitted using a plurality of transmission paths, a radio network controller on each transmission path terminates user data, transmission path by transmission path, by a retransmission protocol, and a mobile station terminates the user data on a per-transmission-path basis. If this expedient is adopted, retransmission control can be performed by sending and receiving user data as separate data streams on a per-transmission-path basis.

Further, retransmission control can also be performed as follows: A radio base station multiplexes the user data of all paths and terminates the user data by a single retransmission control protocol. User data is terminated by a single retransmission control protocol and communication performed as a single data stream also at a mobile station upon combining all transmission paths. User data that has been received from a mobile station is terminated by a retransmission control protocol at a radio base station and is dispersed and transmitted to a plurality of transmission paths. If this expedient is adopted, retransmission control can be carried out combining a plurality of transmission paths.

DESCRIPTION OF THE PREFERRED EMBODIMENTS (A) Overview of the Present Invention

Figure 1:
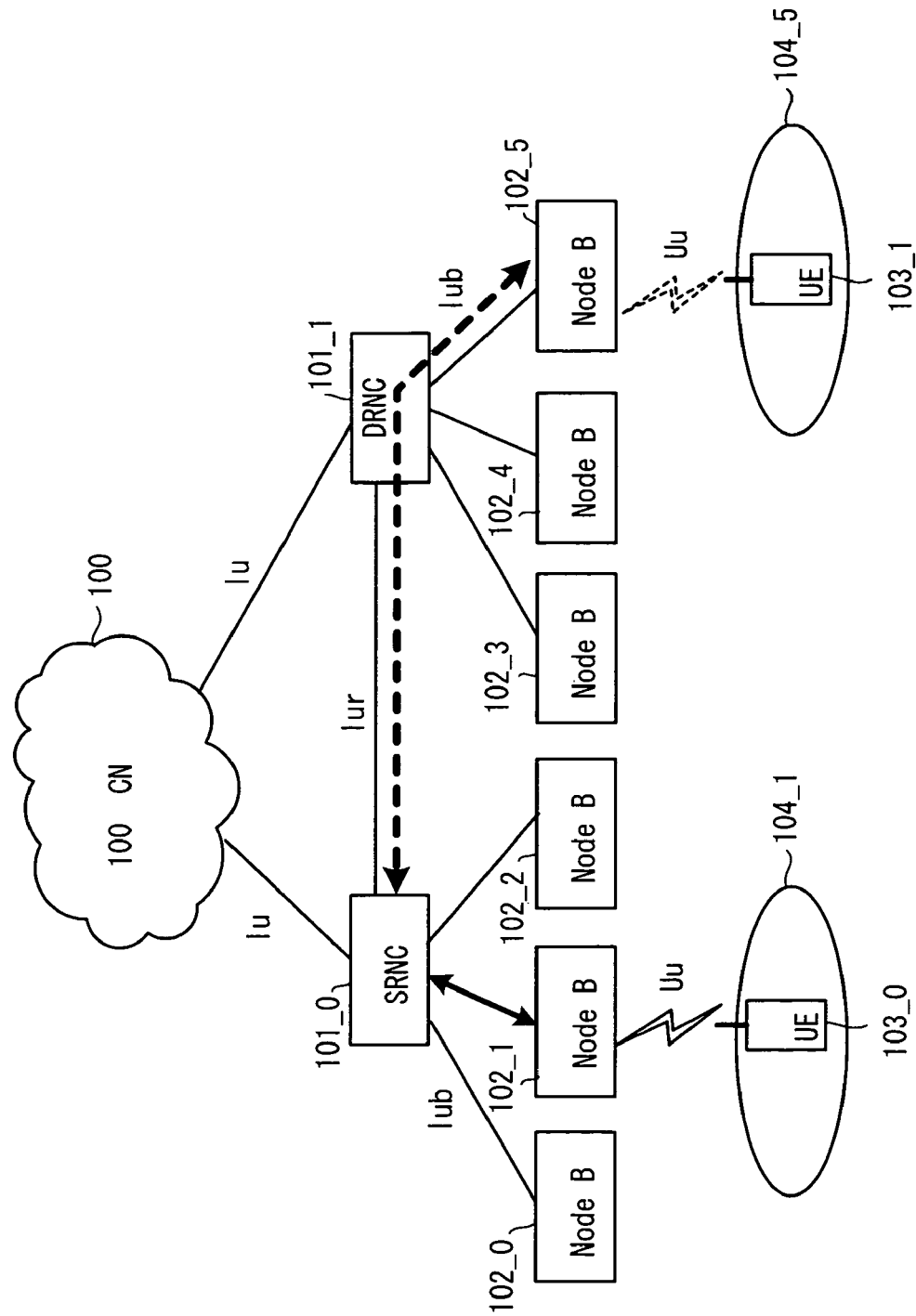
FIG. 1 is a diagram useful in describing flow of a call control signal.

Signals exchanged between a CN and a UE are divided into call control signals and user data. Since the call control signal among these is terminated by the SRNC, the transmission path is inevitably a transmission path that passes through this SRNC just as in the prior art. In other words, as shown in FIG. 1, if a UE is located in cell 104_1 under the control of SRNC 101_0 when communication starts (i.e., in the case of UE 103_0), a downlink call control signal is transmitted from the SRNC 101_0 to Node B 102_1, which accommodates the cell 104_1, via the Iub line (see the bold solid line), after which the signal is transmitted to the UE 103_0 via the Uu interface. Further, an uplink call signal is transmitted in the opposite direction to Node B 102_1 via the Uu interface and thence is transmitted to the SRNC 101_0 via the Iub line.

Further, if the UE moves while communicating and is located in cell 104_5 under the control of an RNC (DRNC: Drift RNC) 101_1 other than the SRNC 101_0 (i.e., in the case of UE 103_1), as shown in FIG. 1, then a downlink control signal is transmitted from SRNC 101_0 to DRNC 101_1 via the Iur line, thence from DRNC 101_1 to Node B 102_5, which accommodates this cell, via the Iub line (see the bold dashed line), and thence to UE 103_1 via the Uu interface. Further, an uplink call signal is transmitted in the opposite direction to Node B 102_5 via the Uu interface, thence to the DRNC 101_1 via the Iub line, and from the DRNC 101_1 to the SRNC 101_0 via the Iur line.

Figure 2:
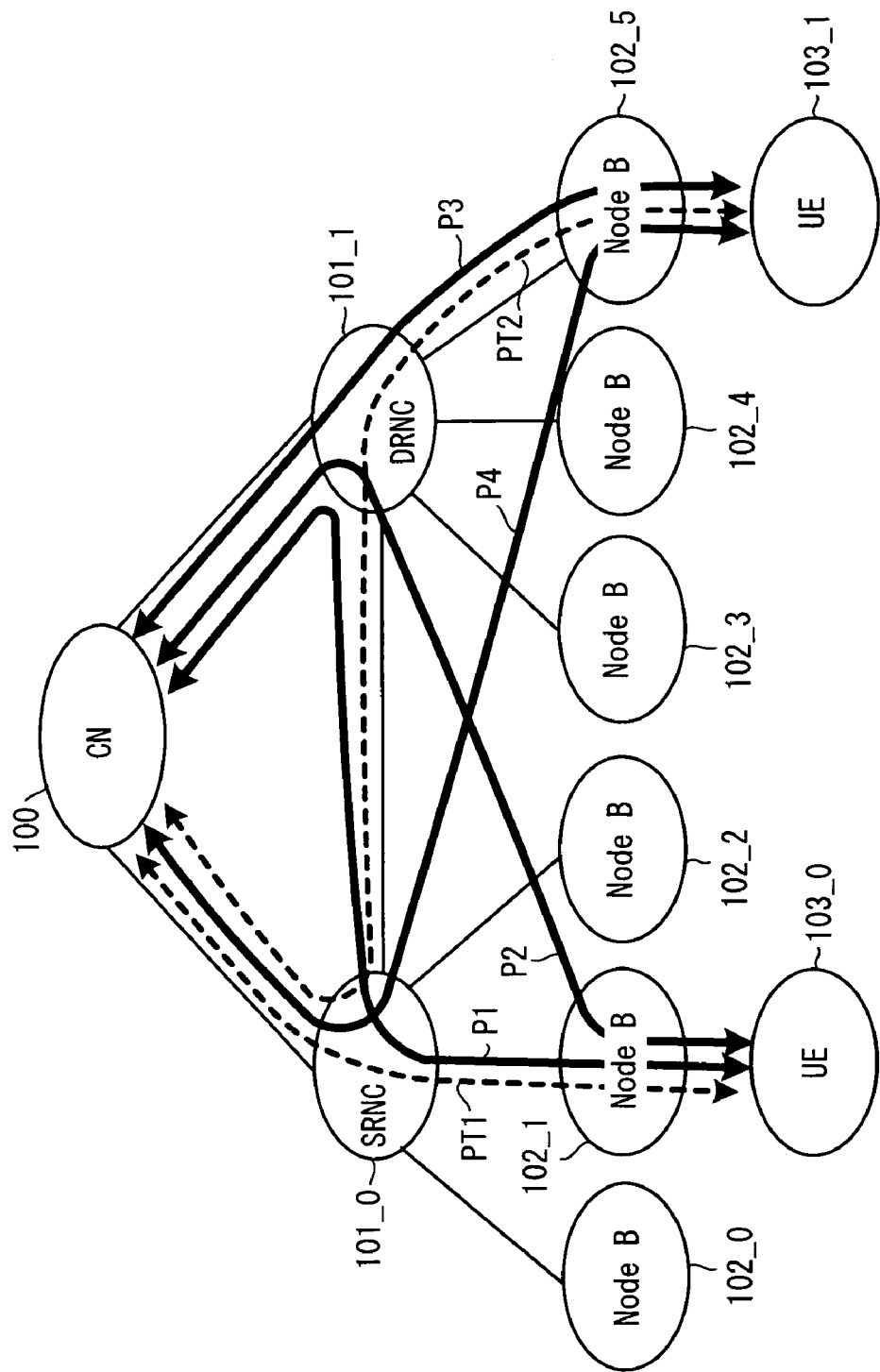
FIG. 2 is a diagram useful in describing a plurality of transmission paths.

With regard to the user data (especially packets), however, many protocols exist that establish data communication, such as SIP or TCP/IP, without termination of the user data at the SRNC 101_0. Unlike call control signals, therefore, it is possible to perform communication of user data without restricting it to the transmission paths of the prior art. Accordingly, as shown in FIG. 2, by transmitting data via transmission paths P1 to P4, which are indicated by the solid lines, other than the previous transmission paths PT1, PT2 (see the solid dashed lines in FIG. 2), it is possible to perform communication upon dispersing the data by a plurality of transmission paths. That is, in a case where the CN 100 and UE 103_0 communicate, it is possible to send and receive data via transmission paths P1, P2 in addition to the previous transmission path PT1. It should be noted that it is assumed that the DRNC 101_1 and Node B 102_1 are physically connected.

By dispersing data on a plurality of transmission paths, the band and processing capability required per node in high-speed data communication can be dispersed to peripheral nodes and it is possible to suppress the band and processing capability per node. Further, by similarly dispersing band and processing capability to peripheral nodes also when there is a sudden increase in band and processing capability owing to concentration of traffic, it is possible to suppress the amount of fluctuation in band and processing capability. Accordingly, the stability of the system can be enhanced and utilization efficiency, i.e., cost performance, can be improved as well.

Figure 3:
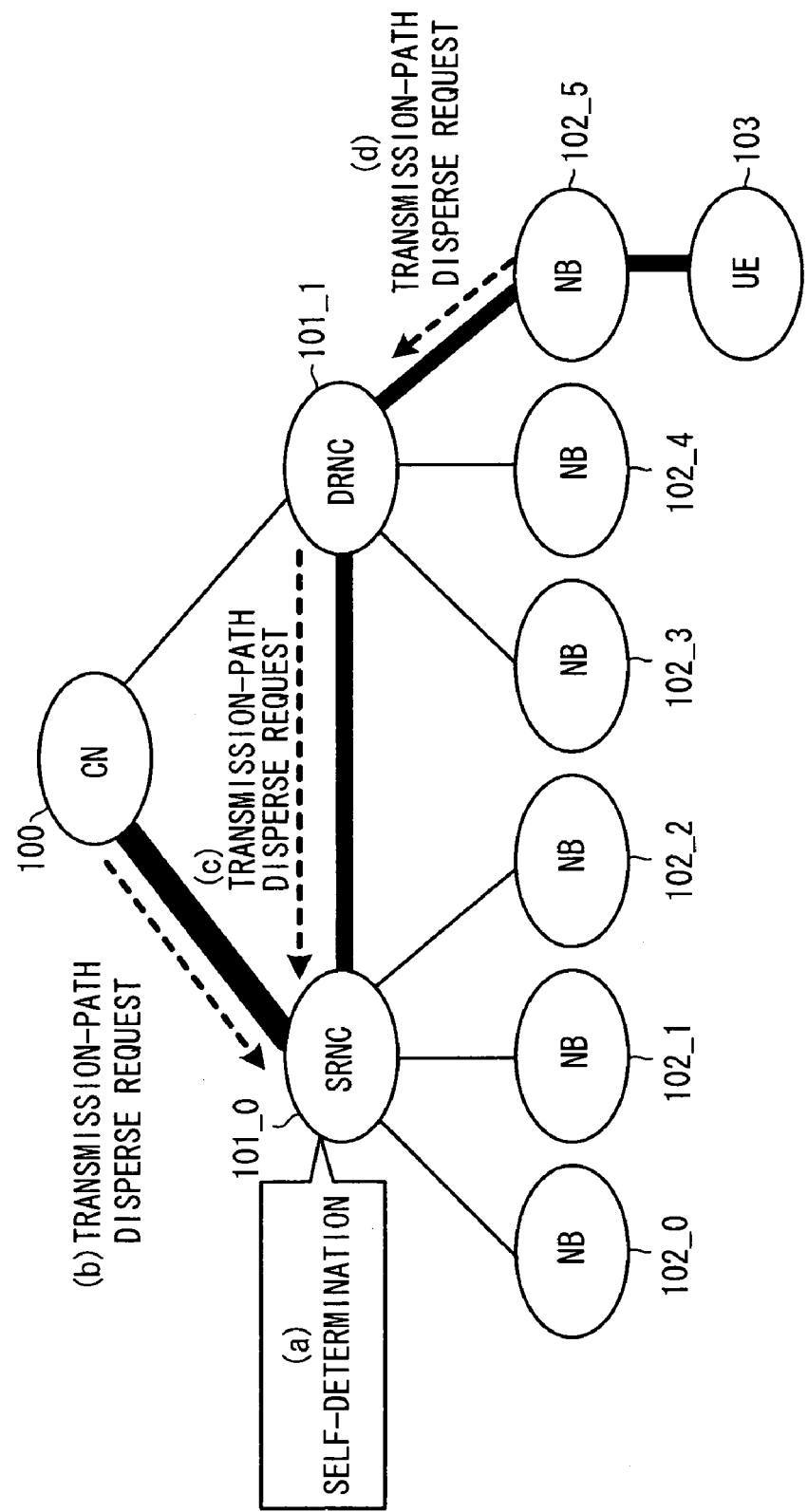
FIG. 3 is a diagram useful in describing a method of determining whether to disperse user data by a plurality of transmission paths.
Figure 4:
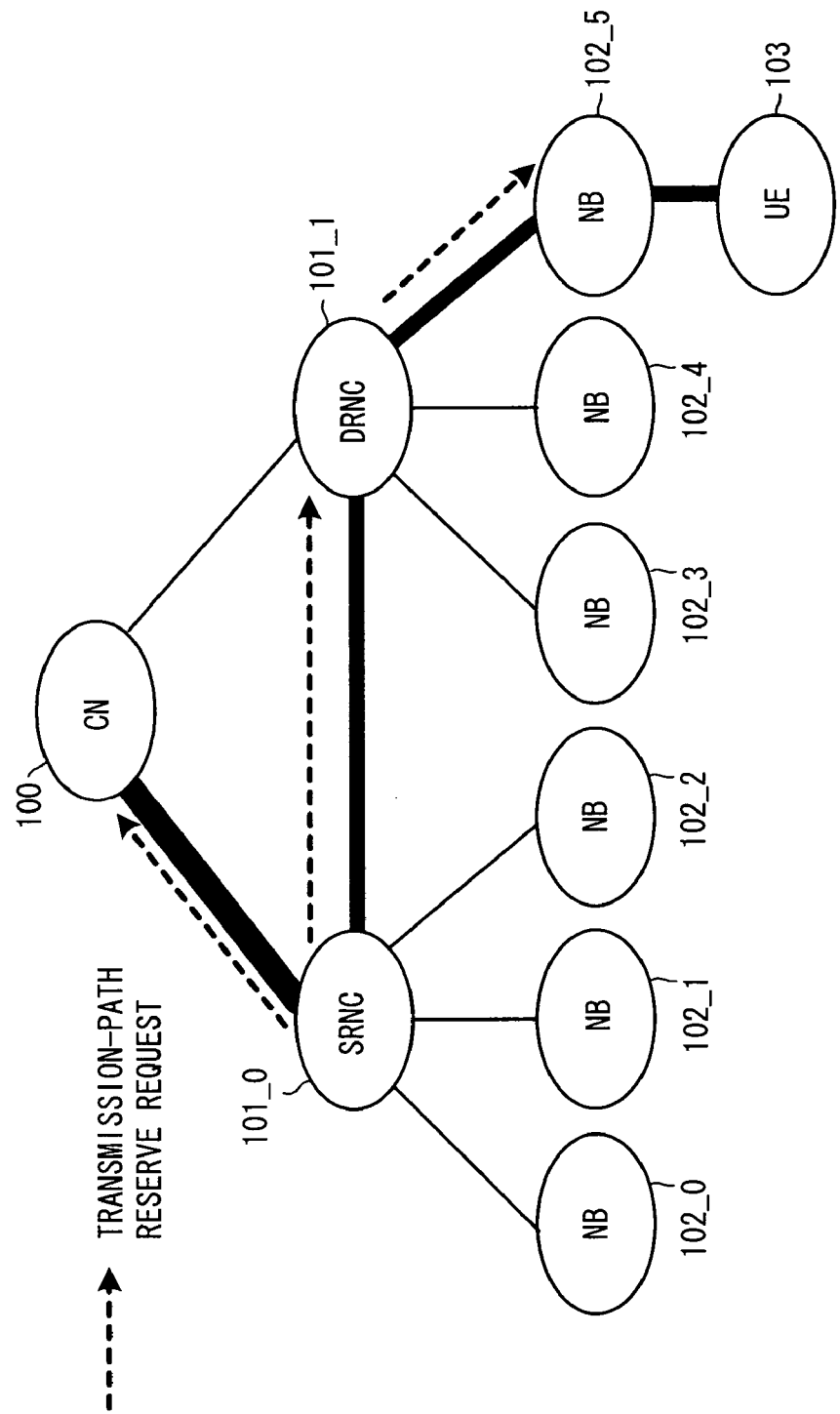
FIG. 4 is a diagram useful in describing a first operation in a mobile communication system of a first embodiment.
Figure 5:
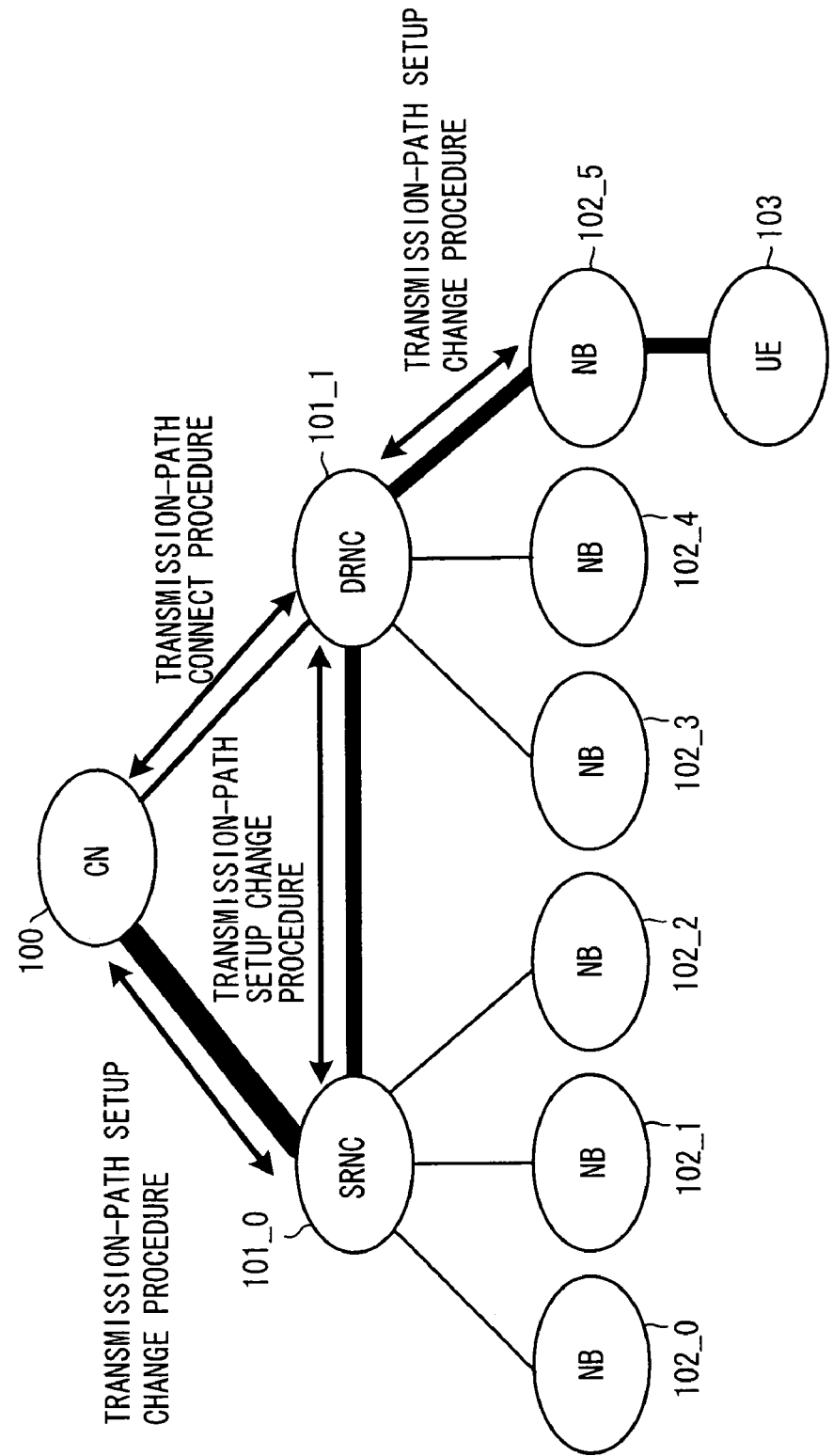
FIG. 5 is a diagram useful in describing a second operation in a mobile communication system of a first embodiment.

FIG. 3 is a diagram useful in describing a method of determining whether to disperse data by a plurality of transmission paths. The larger the band used on a transmission path, the thicker the line. When traffic changes, as in a case where a call is connected anew, a case where the setup of an existing call is changed or a case where the amount of user data communicated increases, it is determined at each node whether the transmission path of user data is to be dispersed or not. The following methods a) to d) are conceivable as methods of making this determination:

a) The SRNC 101_0 determines the necessity for dispersion based upon its own traffic conditions (number of users, status of resources used and status of the band used, etc.).

b) The CN 100 determines the necessity for dispersion based upon the traffic conditions (number of users, status of resources used and status of the band used, etc.) of the transmission path and requests the SRNC 101_0 to disperse the user data that is being transmitted via this transmission path. Alternatively, the CN 100 reports the traffic conditions to the SRNC 101_0 and the SRNC 101_0 determines the necessity for dispersion based upon these conditions.

c) The DRNC 101_1 determines the necessity for dispersion based upon the traffic conditions (number of users, status of resources used and status of the band used, etc.) and requests the SRNC 101_0 to disperse the user data of a prescribed transmission path. Alternatively, the DRNC 101_1 reports the traffic conditions to the SRNC 101_0 and the SRNC 101_0 determines the necessity for dispersion based upon these conditions.

d) The Node B 102_5 determines the necessity for dispersion based upon the traffic conditions (number of users, status of resources used and status of the band used, etc.) and requests the SRNC 101_0 or DRNC 101_1 to disperse the user data. Alternatively, the Node B 102_5 reports the traffic conditions to the SRNC 101_0 and the SRNC 101_0 determines the necessity for dispersion based upon these conditions.

The following methods are conceivable as methods of issuing the request from the CN 100, DRNC 101_1 or Node B 102_5: ① A method in which only the fact that it is necessary to disperse user data is indicated and which call is to be dispersed by a plurality of transmission paths is decided by the SRNC 101_0; ② a method in which a call desired to be dispersed from the CN, DRNC or Node B is indicated to the SRNC 101_0; ③ and a method in which a path (VPI/VCI in case of ATM) desired to be dispersed from the CN, DRNC or Node B is indicated to the SRNC 101_0. The indication can be made to include the amount of band desired to be diminished by dispersion.

(B) First Embodiment (a) Overall Operation of Mobile Communication System

FIGS. 4 to 7 are diagrams for describing the overall operation of a mobile communication system according to a first embodiment.

In the first embodiment, the SRNC 101_0 (FIG. 4) determines the necessity for dispersion based upon traffic conditions (number of users, status of resources used and status of the band used, etc.). That is, a controller of the SRNC 101_0 determines whether to disperse user data by a plurality of transmission paths when traffic has changed, as in a case where a call has been connected anew, or in a case where the setup of an existing call has been changed or in a case where the amount of user data communicated has increased.

If it has been determined that it is necessary to disperse the transmission path, a transmission-path reserve request is transmitted to the nodes relating to dispersion (the CN 100, DRNC 101_1 and Node B 102_5 that accommodates the cell in which the UE 103 is located). In a case where the transmission-path reserve request is transmitted to Node B 102_5, which is not under the control of the SRNC, the transmission-path reserve request is transmitted to the DRNC 101_1 that accommodates this Node B and the DRNC responds to the request indication by transferring the transmission-path reserve request to the Node B 102_5 under its control. Examples of the transmission-path reserve request are a call or line (e.g. VPI/VCI) desired to be dispersed or transmission-path specifying information (path information, necessary band, etc.).

Each node that has received the transmission-path reserve request reserves a transmission path, on which user data is to be dispersed, in accordance with the content of the request from the SRNC 101_0 and the status of resources of its own node, and executes a procedure for setting up a new connection between itself and the adjacent nodes on this transmission path. In a case where it is necessary to change the existing transmission path, the node executes a procedure to change the setup content between itself and the adjacent nodes (see FIG. 5).

Figure 6:
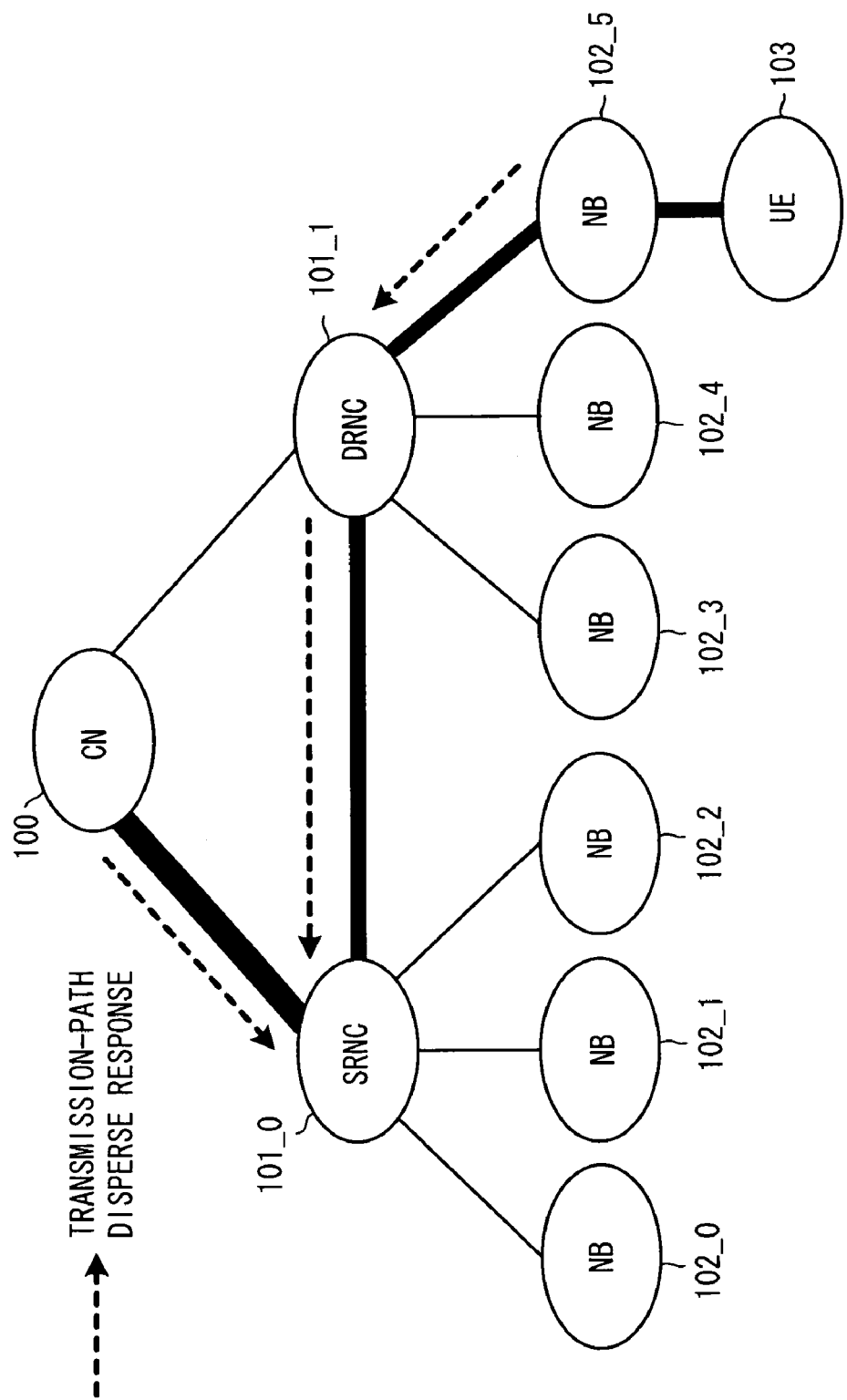
FIG. 6 is a diagram useful in describing a third operation in a mobile communication system of a first embodiment.

If the acquisition of the dispersion transmission path and the setup change procedure or procedure for the new connection are completed, each node sends back a transmission-path disperse response to the SRNC 101_0 (see FIG. 6). It should be noted that in order to send back a response from the Node B 102_5 not under the control of the SRNC, the response is sent back to the DRNC 101_1 that accommodates the Node B 102_5 and the DRNC 101_1 sends the response back to the SRNC 101_0.

Figure 7:
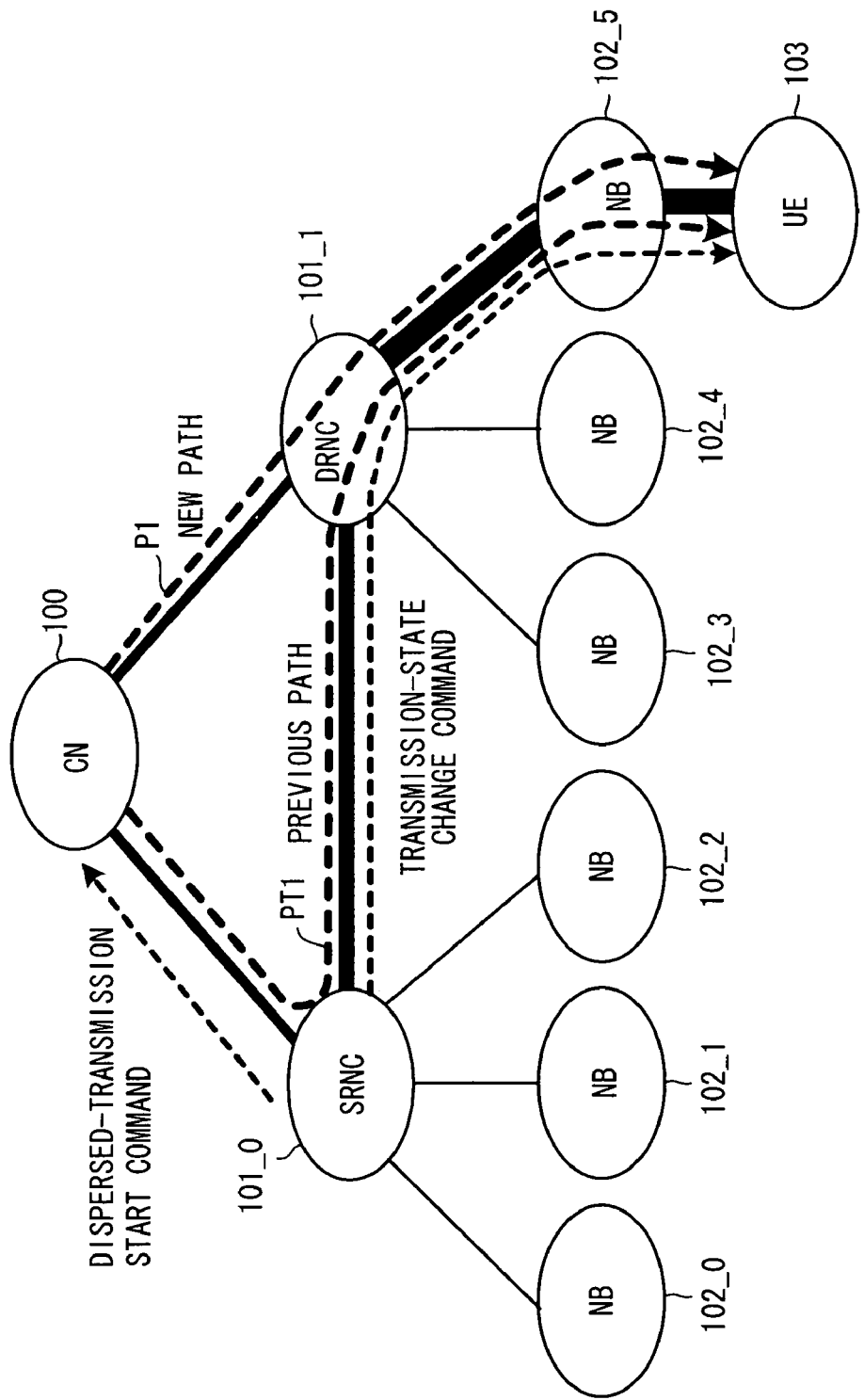
FIG. 7 is a diagram useful in describing a fourth operation in a mobile communication system of a first embodiment.

If the SRNC 101_0 confirms by the transmission-path reserve responses from other nodes that the acquisition of the dispersion transmission path and the setup change procedure or procedure for the new connection have been completed, then the SRNC 101_0 notifies the UE 103 of the fact that the transmission path has been dispersed (i.e., issues a transmission-state change notification) and instructs the CN 100 to start the dispersed transmission of the user data (see FIG. 7).

Thus, a new transmission path P1 is set up in addition to the previous transmission path PT1, the designated user data is dispersed from the CN 100 to the transmission paths PT1, P1 and is transmitted to Node B 102_5, and Node B 102_5 transmits this user data to the UE 103 wirelessly.

Figure 8:
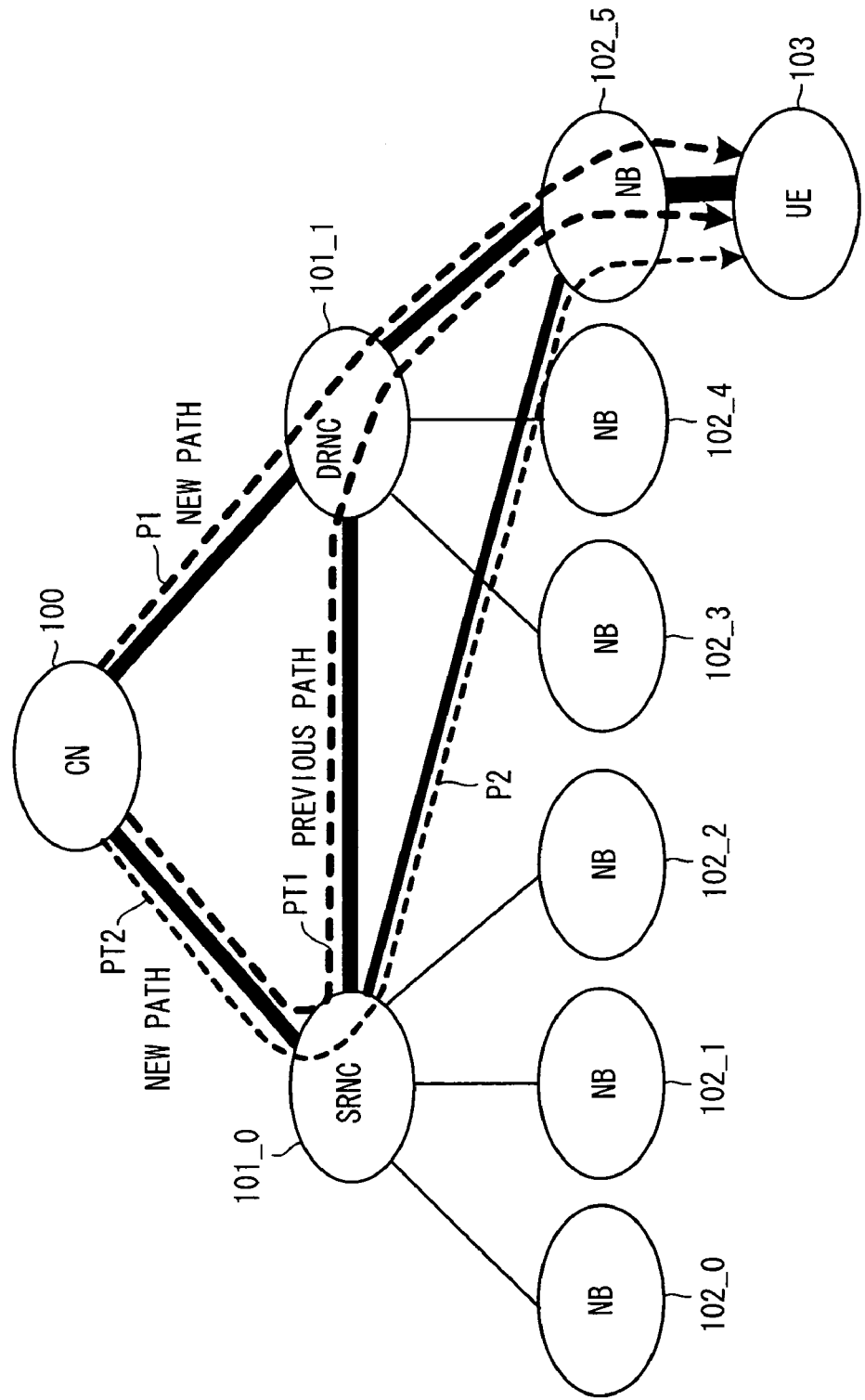
FIG. 8 is a diagram useful in describing other dispersing transmission paths.

According to the first embodiment, CN 100 distributes user data to the two transmission paths PT1, P1. However, upon taking traffic between SRNC 101_0 and DRNC 101_1 into account, user data between the CN and these two nodes can also be dispersed simultaneously, as illustrated in FIG. 8. Examples of dispersed paths in FIG. 8 are path P1 from CN 100 via DRNC 101_1, and path P2 connected directly from SRNC 101_0 to the Node B 102_5 under the control of DRNC 101_1. In order to disperse user data to path P2, a link physically connecting SRNC 101_0 and Node B 102_5 is necessary.

(b) Dispersion Processing by SRNC 101_0

Figure 9:
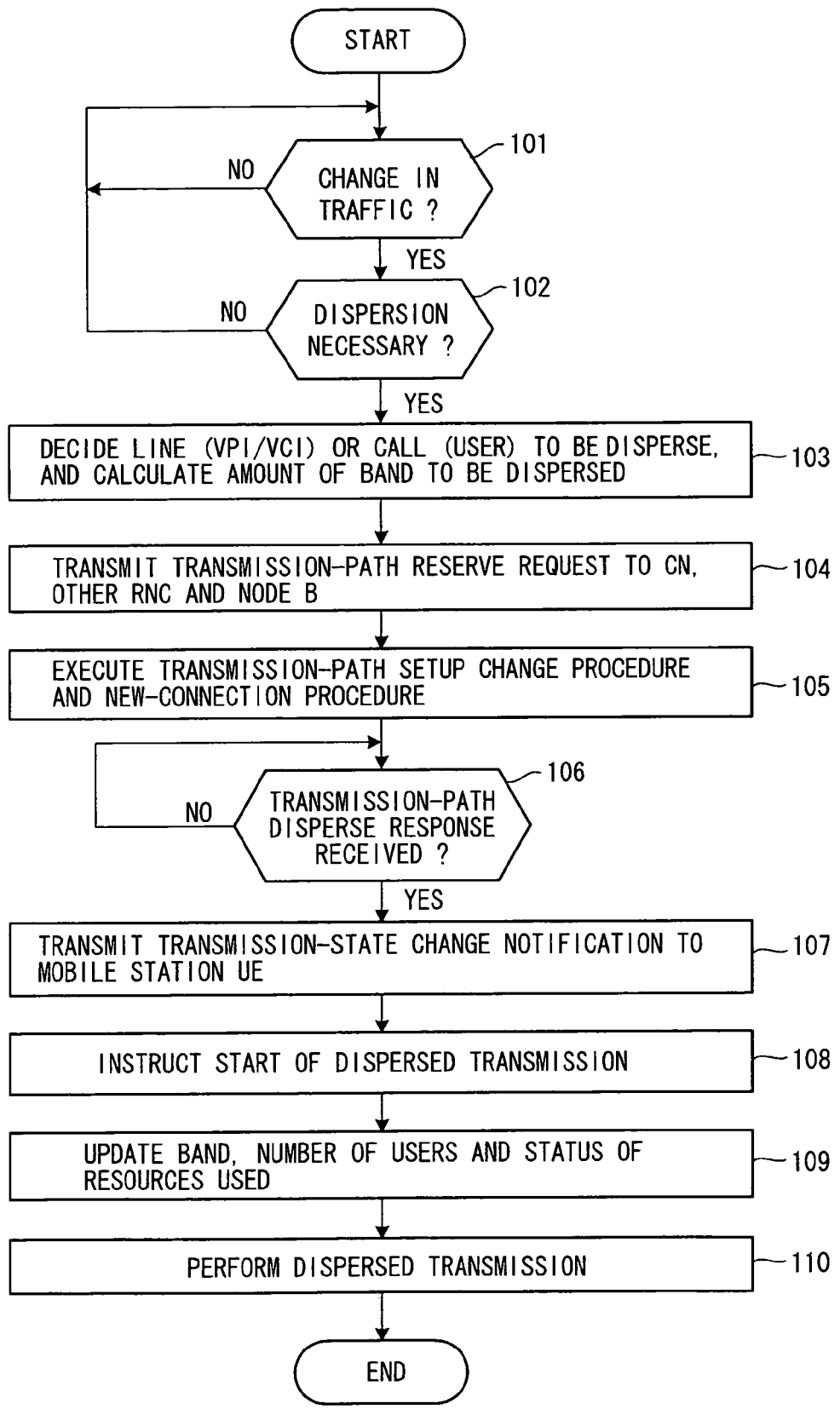
FIG. 9 is a flowchart of dispersion processing by an SRNC in the first embodiment.

FIG. 9 is a flowchart of dispersion processing by the SRNC 101_0 in the first embodiment.

The SRNC 101_0 monitors whether traffic has changed (step 101). If traffic has changed, the SRNC 101_0 determines whether user data is to be dispersed by a plurality of transmission paths (step 102).

If dispersion by a plurality of transmission paths is necessary, the SRNC decides the line (e.g., VPI/VCI) or call (user) to be dispersed and calculates the band to be dispersed (step 103). Next, the SRNC transmits the transmission-path reserve request to the nodes relating to dispersion (the CN 100, DRNC 101_1 and Node B 102_5 that accommodates the cell in which the UE 103 is located) (step 104). The transmission-path reserve request includes the call or line (VPI/VCI) desired to be dispersed or transmission-path specifying information (path information, necessary band, etc.).

Next, if establishment of a new transmission path is required, the SRNC 101_0 executes a procedure for setting up a new connection between itself and the adjacent nodes on this transmission path. In a case where it is necessary to change the existing transmission path, the SRNC 101_0 executes a procedure to change the setup content between itself and the adjacent nodes (step 105).

The SRNC thenceforth checks to determine whether a transmission-path disperse response has been received from each of the nodes (step 106). If transmission-path disperse responses have been received from all nodes, then the SRNC notifies the UE 103 of the fact that the transmission path has been dispersed (i.e., issues a transmission-state change notification) (step 107) and instructs the CN 100 to start the dispersed transmission of the user data (step 108). Finally, the SRNC updates the band, number of users (number of calls) and status of resources used (step 109) and executes dispersed transmission (step 110).

(c) Dispersion Processing by CN 100

Figure 10:
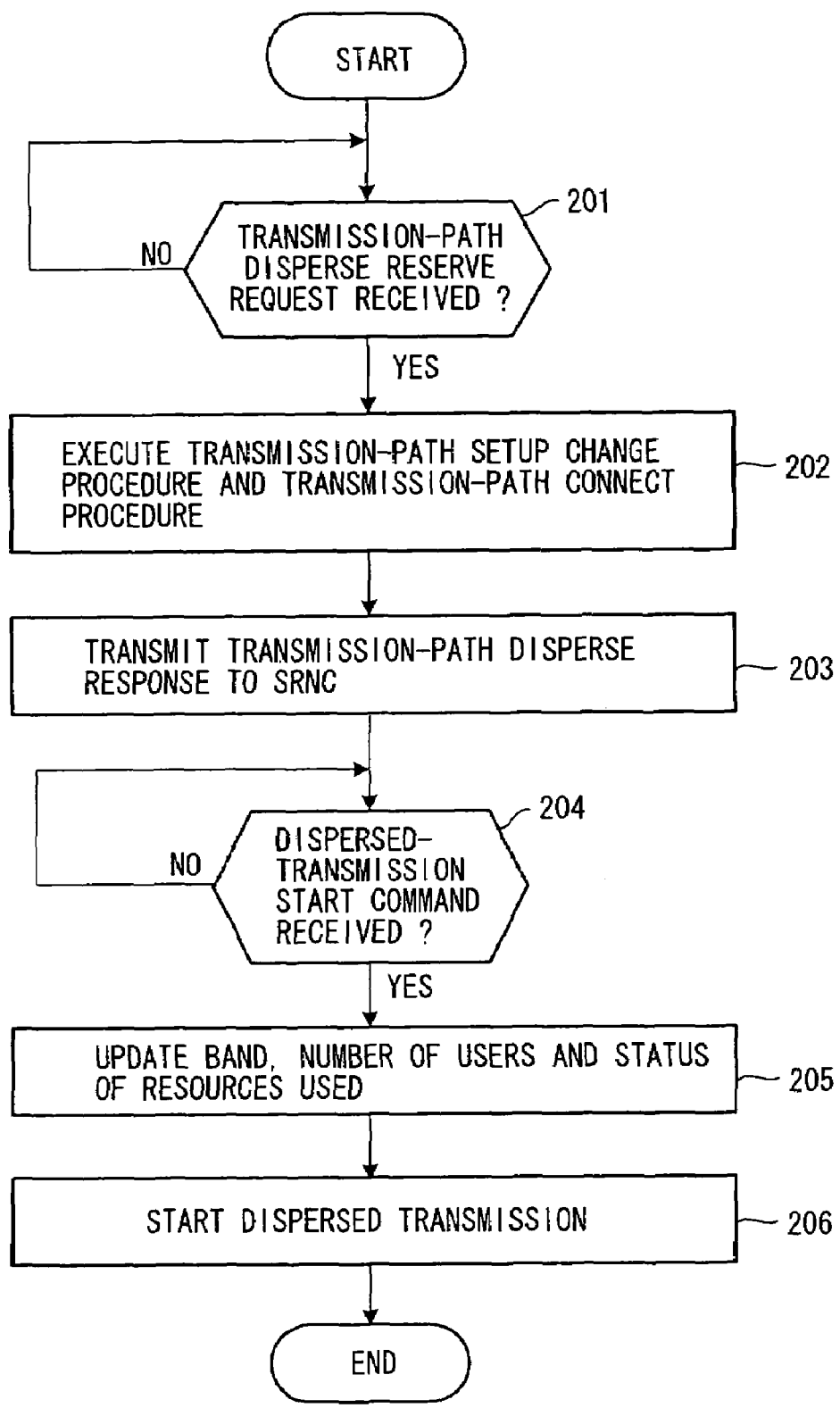
FIG. 10 is a flowchart of dispersion processing by a CN in the first embodiment.

FIG. 10 is a flowchart of dispersion processing by the CN 100.

The CN 100 monitors whether the transmission-path reserve request has been received from the SRNC 101_0 (step 201). If the transmission-path reserve request has been received, the CN 100 refers to the information contain in the transmission-path reserve request and, if it is necessary to establish a new transmission path, executes a procedure for setting up a new connection between itself and the adjacent nodes on this transmission path. Further, if it is necessary to change the existing transmission path, the CN 100 executes a procedure to change the setup content between itself and the adjacent nodes (step 202).

If the procedure for the new connection or the procedure for changing the setup content has been completed, the CN 100 transmits the transmission-path disperse response to the SRNC 101_0 (step 203) and waits for a dispersed-transmission start command from the SRNC 101_0 (step 204). If the dispersed-transmission start command is received, the CN 100 updates the band, number of users and status of resources used (step 205) and thenceforth starts dispersed transmission (step 206).

It should be noted that dispersion processing by other nodes (DRNC, Node B) can be executed in a manner similar to the processing flow of FIG. 10. Step 204, however, is not necessarily required.

(d) Structure of Each Node

Figure 11:
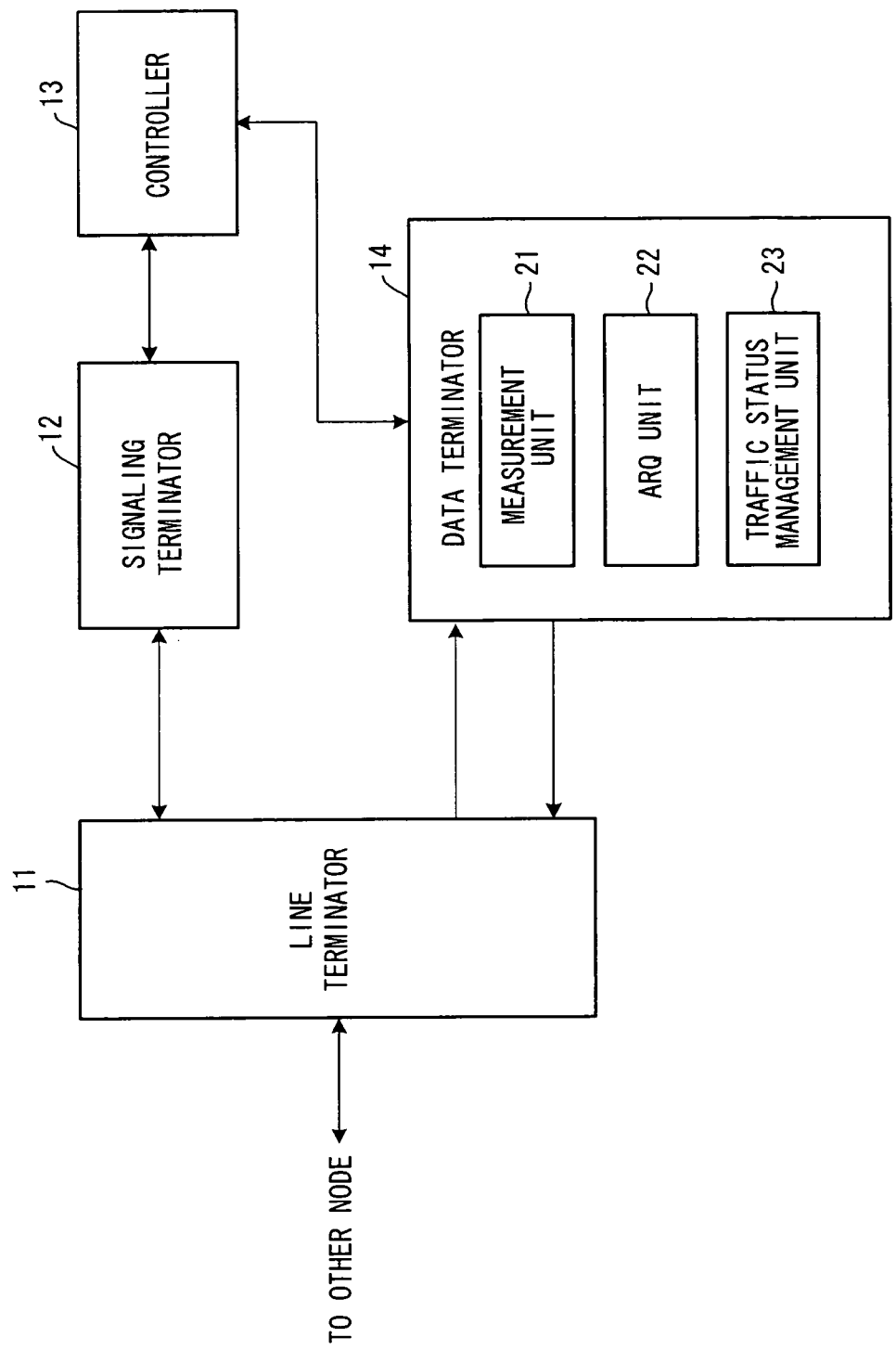
FIG. 11 is a block diagram of each node (CN, SRNC, DRNC) in the embodiments of the present invention.
Figure 12:
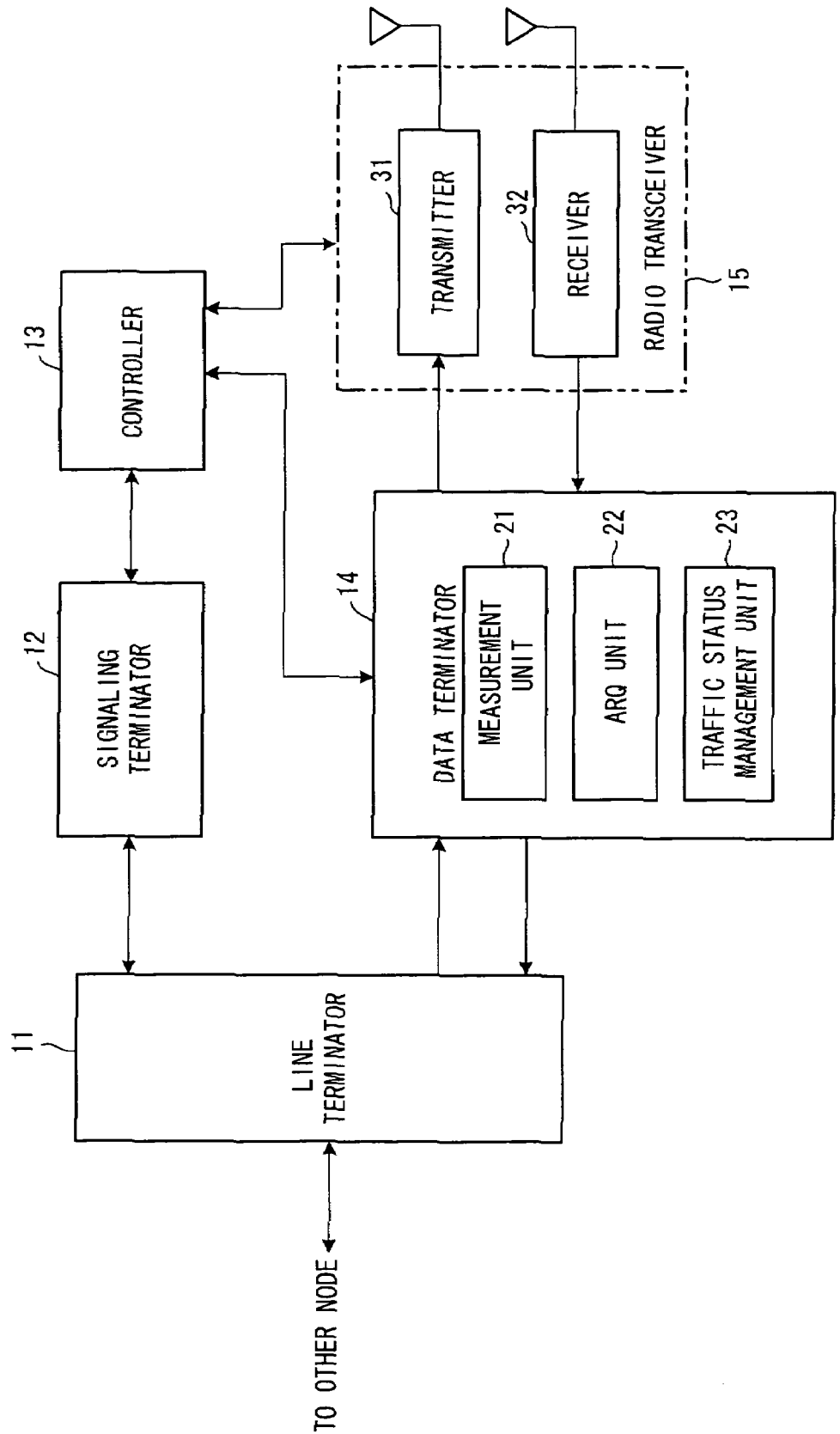
FIG. 12 is a block diagram of Node B.

FIG. 11 is a block diagram of each node (CN, SRNC, DRNC) in the mobile communication system of the present invention, and FIG. 12 is a block diagram of Node B.

In FIG. 11, a line terminator 11 at each node (CN, SRNC, DRNC) has a function for executing line termination processing and for separating a receive signal into user data and a control signal and multiplexing the user data and control signal. A signaling terminator 12 terminates control signals received from other nodes and reports these signals to a controller 13, and it inputs control signals, which have been received from the controller 13 and destined for other nodes, to the line terminator 11.

A data terminator 14 terminates user data from other nodes and user data destined for other nodes, and it also transfers user data to each transmission path based upon a command from the controller 13. Further, the data terminator 14 has a measurement unit 21, an ARQ unit 22 and a traffic status management unit 23. The measurement unit 21 measures the traffic/band of user data and reports this to the controller 13. The ARQ unit 22 terminates data streams by an ARQ (Automatic Repeat Request: retransmission control) protocol path by path. The traffic status management unit 23 manages the present traffic conditions (band used, number of calls, i.e., number of users, and status of resources used, etc.) of its own node.

Based upon the result of measurement from the measurement unit 21, the controller 13 determines whether another node is to be instructed/requested to disperse the transmission path and instructs the signaling terminator 12 to transmit a control signal. Conversely, the controller 13 receives a control signal from another node by way of the signaling terminator 12 and executes acquisition/dispersion control of the transmission path in accordance with the content of the signal. In case of the SRNC 101_0, the controller 13 notifies the CN 100 and UE 103 of a change in the user-data transmission scheme that accompanies dispersion of the transmission path.

As shown in FIG. 12, Node B has a structure the same as that of FIG. 11 except for the inclusion of a radio transceiver 15. The radio transceiver 15 has a transmitter 31 for spreading transmit data by a prescribed spreading code, subsequently subjecting the data to orthogonal modulation, frequency conversion and high-frequency amplification and transmitting the result, and a receiver 32 for subjecting a received radio signal to frequency conversion and orthogonal detection to thereby effect a conversion to a baseband signal, and then despreading the signal by a despreading code and demodulating the data.

(e) Format of AAL Type 2 of ATM Cell

Figure 13:
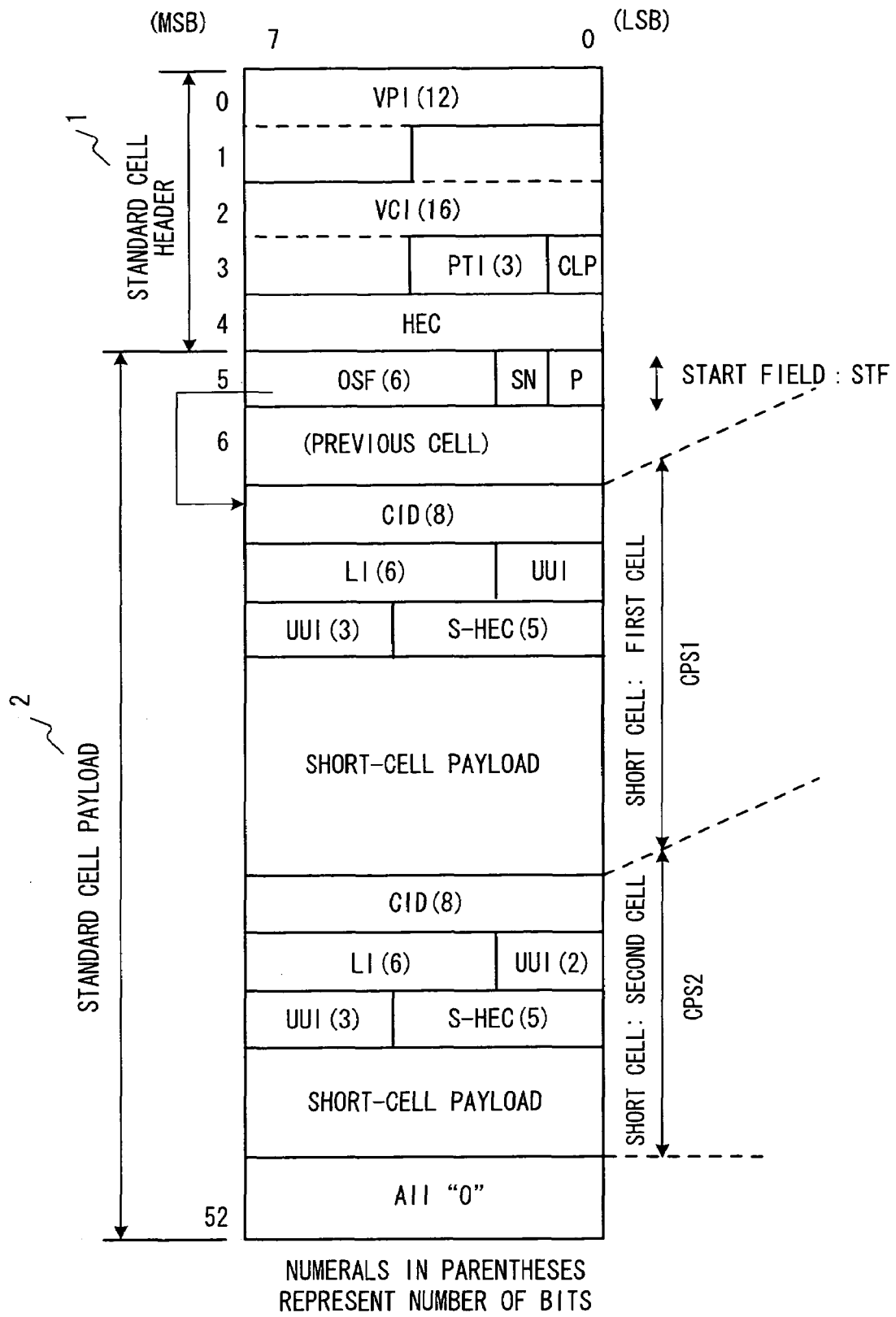
FIG. 13 a diagram useful in describing the format of an AAL Type 2 of an ATM cell sent and received between nodes in a wired section.

FIG. 13 a diagram useful in describing the format of an AAL Type 2 of an ATM cell sent and received between nodes in a wired section. A 53-byte having the AAL Type 2 format is composed of a standard cell header (ATM cell header) 1 and a standard cell payload 2. A 1-byte start field STF and one or more short cells CPS1, CPS2 are mapped to the standard cell payload 2.

The start field STF is composed of (1) an offset field OFS in which a pointer (offset value) indicating the head position of the first short cells is stored, (2) a field SN for storing a 1-bit sequence number, and (3) a parity field PD Each of the short cells CPS1, 2 is composed of a fixed-length short-cell header and a variable-length short-cell payload. Embedded in the short-cell header are (1) a CID (short-cell connection identifier) for identifying a short-cell connection, (2) a length indicator (LI) indicating the payload length of the short cell, (3) a user-user identifier UUI (two bits) on the higher order side, (4) a user-user identifier UUI (three bits) on the lower order side, and a (5) header-error control data. One item of call information (control information and user data) is embedded in the short-cell payload.

Accordingly, a plurality of items of call (channel) information can be transmitted by mapping a plurality of short cells by a single cell of AAL Type 2.

(f) Modification

In the first embodiment, a mobile communication system that includes two RNCs is described. However, the present invention can also be applied to a system that includes a number of RNCs as a matter of course.

Further, an arrangement can be adopted in which when user data is being dispersed and transmitted via a plurality of transmission paths in accordance with the first embodiment, the traffic conditions are monitored and dispersing transmission paths are added on or deleted based upon the traffic conditions.

Further, dispersion of user data by a plurality of transmission paths is performed in accordance with the first embodiment. However, it can be so arranged that if it is determined that the effect of dispersion is unsatisfactory, the SRNC 101_0 selects another call or line and implements transmission-path dispersion repeatedly by a similar sequence. Conceivable methods of determining whether transmission-path dispersion should be performed again include a method of making the determination by comparing the amount of band reduction that should be made, which is indicated from the relevant node, with the actual amount of band reduction, and a method of requesting each node to measure traffic conditions after transmission-path dispersion and making the determination based upon a reported value from the relevant node.

(C) Second Embodiment

A second embodiment determines whether a node other than an SRNC (namely a CN, DRNC and Node B accommodating the cell in which a UE is located) will be dispersed and requests the SRNC to perform dispersion in a case where dispersion has been determined.

Figure 14:
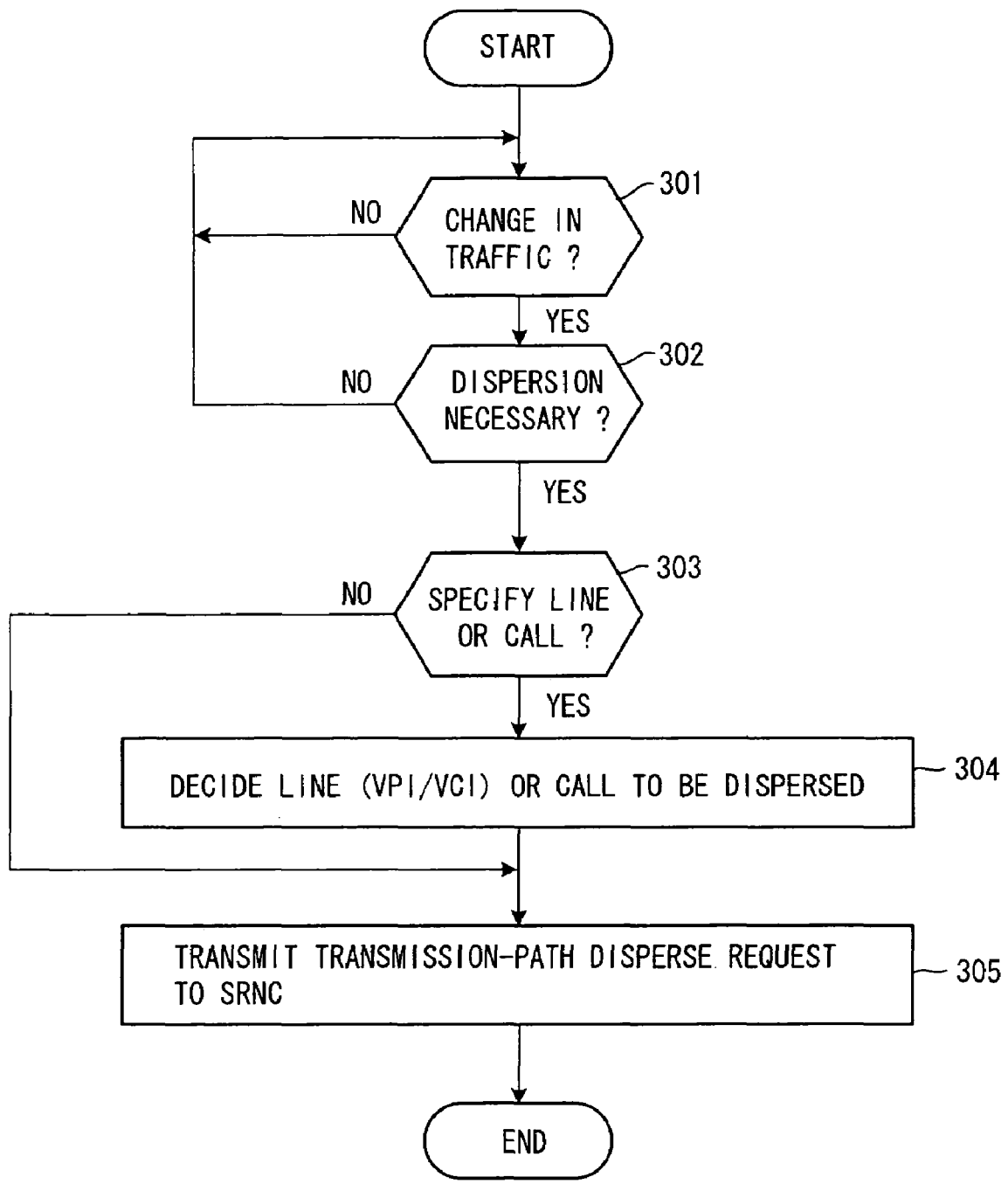
FIG. 14 is flowchart of processing by a node other than an SRNC in the second embodiment.

FIG. 14 is flowchart of processing by a node other than the SRNC 101_0 in the second embodiment.

In FIG. 3, a node other than the SRNC 101_0 (namely the CN 100, DRNC 101_1, Node B) monitors whether traffic has changed (step 101). If traffic has changed, the node determines whether the transmission path of user data is to be dispersed (step 302).

If it is necessary to disperse the transmission path, the node determines whether to specify a line (e.g., VPI/VCI) or call to be dispersed (step 303). If a line or call to be dispersed is specified, then the line or call is decided (step 304) and a control signal (transmission-path disperse request) requesting dispersion is transmitted to the SRNC 101_0 (step 305). This transmission-path disperse request includes the line or call desired to be dispersed. Further, the node can calculate the amount of band desired to be dispersed based upon the traffic conditions measured at this node and the resources of this node and can incorporate this band in the transmission-path disperse request.

If it is determined at step 303 that it is unnecessary to specify a line or call to be dispersed, then the node transmits the transmission-path disperse request to the SRNC 101_0 immediately (step 305).

Figure 15:
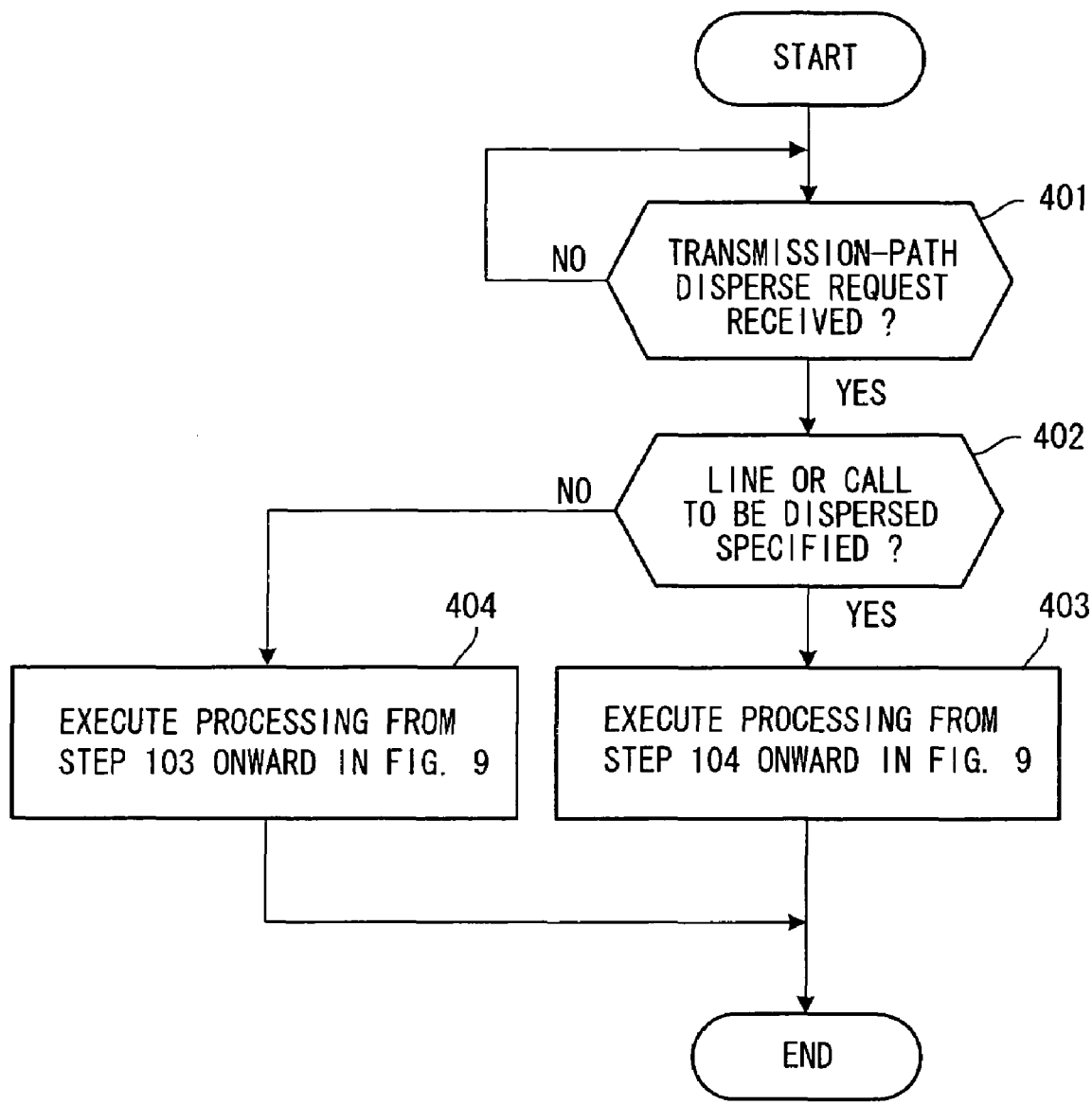
FIG. 15 is a flowchart of processing by an SRNC in the second embodiment.

FIG. 15 is a flowchart of processing by the SRNC 101_0 in the second embodiment

The SRNC 101_0 performs monitoring to determine whether the transmission-path disperse request has been received from another node (step 401). If the request has been received, then the SRNC 101_0 checks to see whether a line or call to be dispersed has been specified (step 402). If the line or call has been specified, then processing from step 104 onward in FIG. 9 is executed and dispersion by a plurality of transmission paths is performed with regard to the line or call specified (step 403).

On the other hand, if it is determined at step 402 that a line or call to be dispersed has not been specified, then processing from step 103 onward in FIG. 9 is executed, the line or call to be dispersed is decided, the amount of band to be dispersed is decided and dispersion by a plurality of transmission paths is performed with regard to the line or call that has been decided (step 404).

In accordance with the second embodiment, dispersion of user data by a plurality of transmission paths is performed. However, it can be so arranged that if it is determined that the effect of dispersion is unsatisfactory, another node requests the SRNC 101_0 to disperse user data again.

(D) Retransmission control

The user data from the CN 100 is dispersed on a plurality of transmission paths PT1, P1, P2 (see FIG. 8), reaches the Node B 102_5 by being transmitted on these paths and is transmitted wirelessly to the UE 103 from the Node B 102_5. The data is sent and received using a well-known retransmission control protocol in order to eliminate loss of data in a wireless section.

A third embodiment is a retransmission control method in a case where user data is dispersed and transmitted.

In case of dispersed transmission, the following two methods (a) and (b) are proposed as methods of terminating user data by a transmission control protocol.

Figure 16:
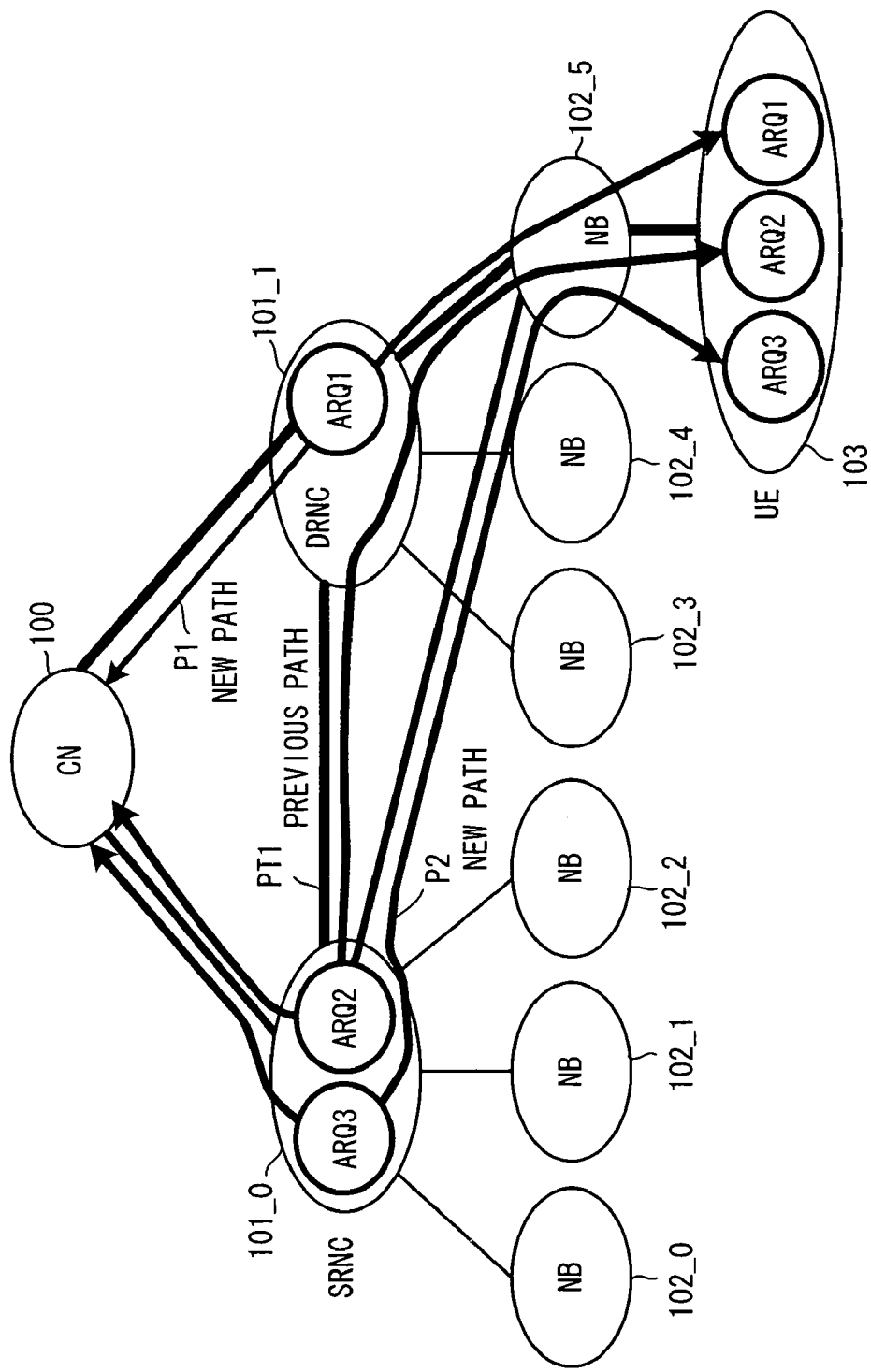
FIG. 16 is a diagram useful in describing a first method of retransmission control at the time of dispersed transmission.

(a) The first method handles data as separate data streams for every path PT1, P1, P2, as illustrated in FIG. 16. Specifically, at each RNC (SRNC 101_0, DRNC 101_1) on a path, retransmission control protocols ARQ1 to ARQ3 are provided by data stream by data stream, the UE 3 is provided with protocols ARQ to ARQ3 of all data streams, and communication is performed with the UE 103 while retransmission control is carried out data stream by data stream.

Figure 17:
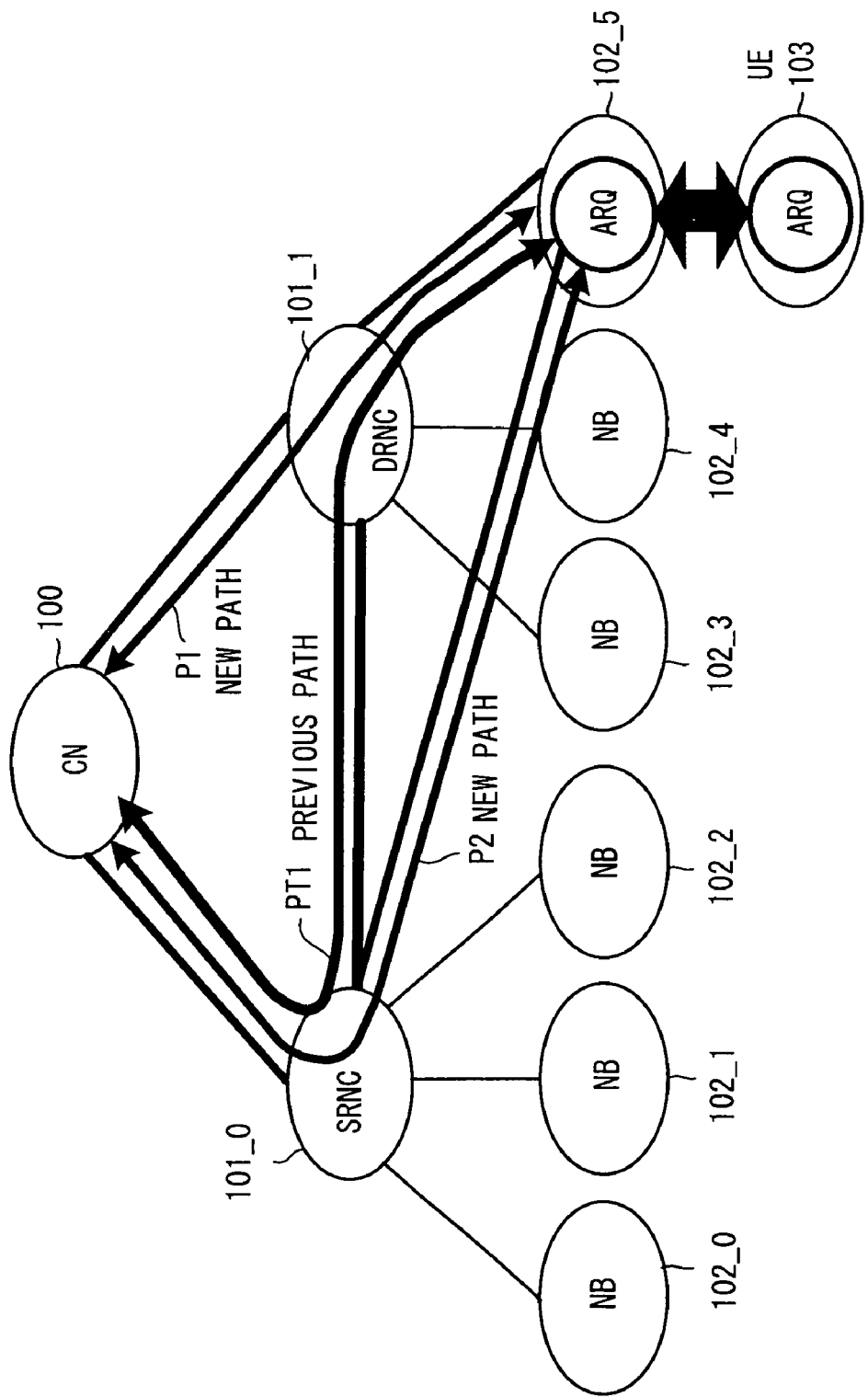
FIG. 17 is a diagram useful in describing a second method of retransmission control at the time of distributed transmission.
Figure 18:
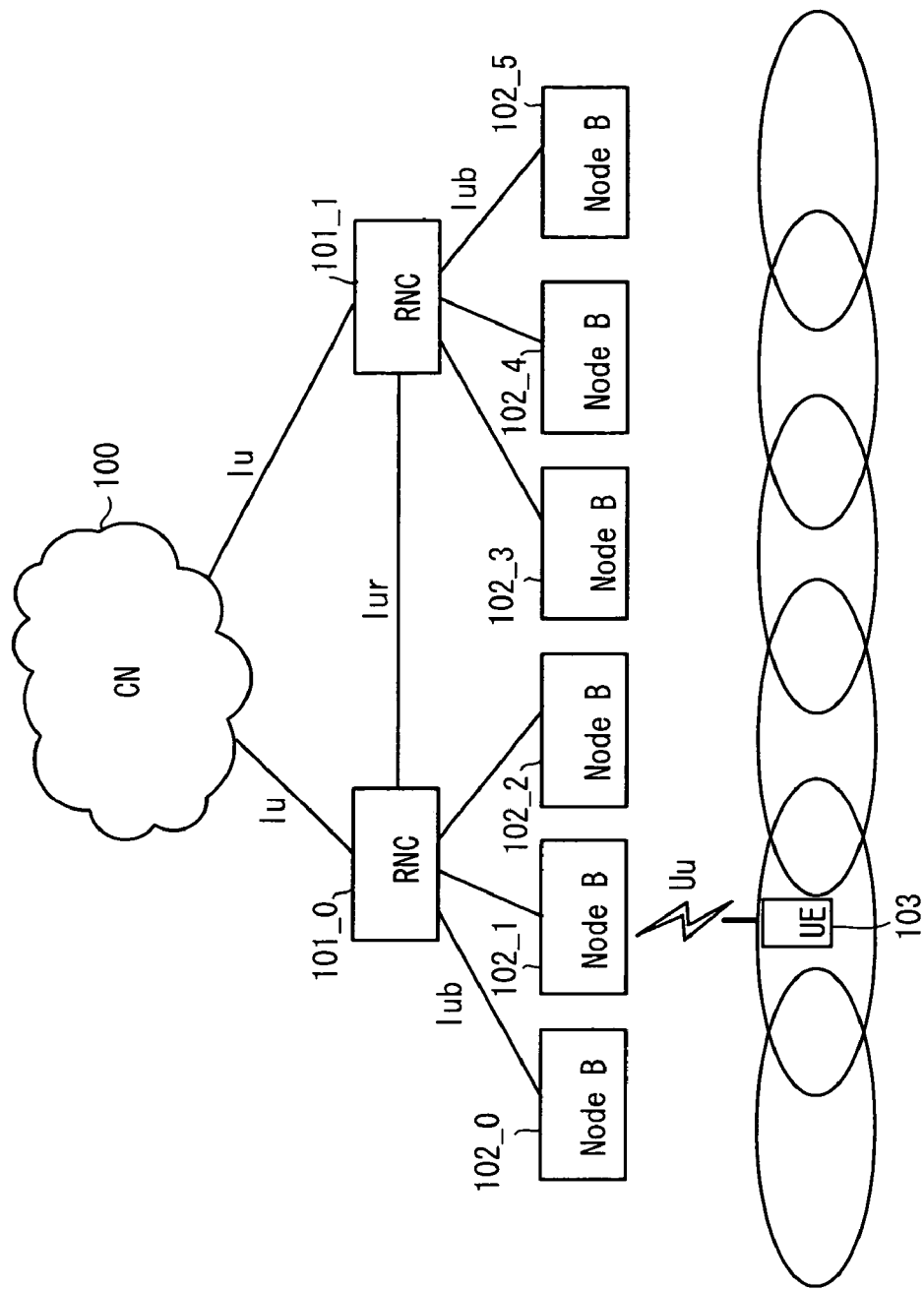
FIG. 18 is a diagram showing an overview of a W-CDMA system that is compliant with current 3GPP specifications.
Figure 19:
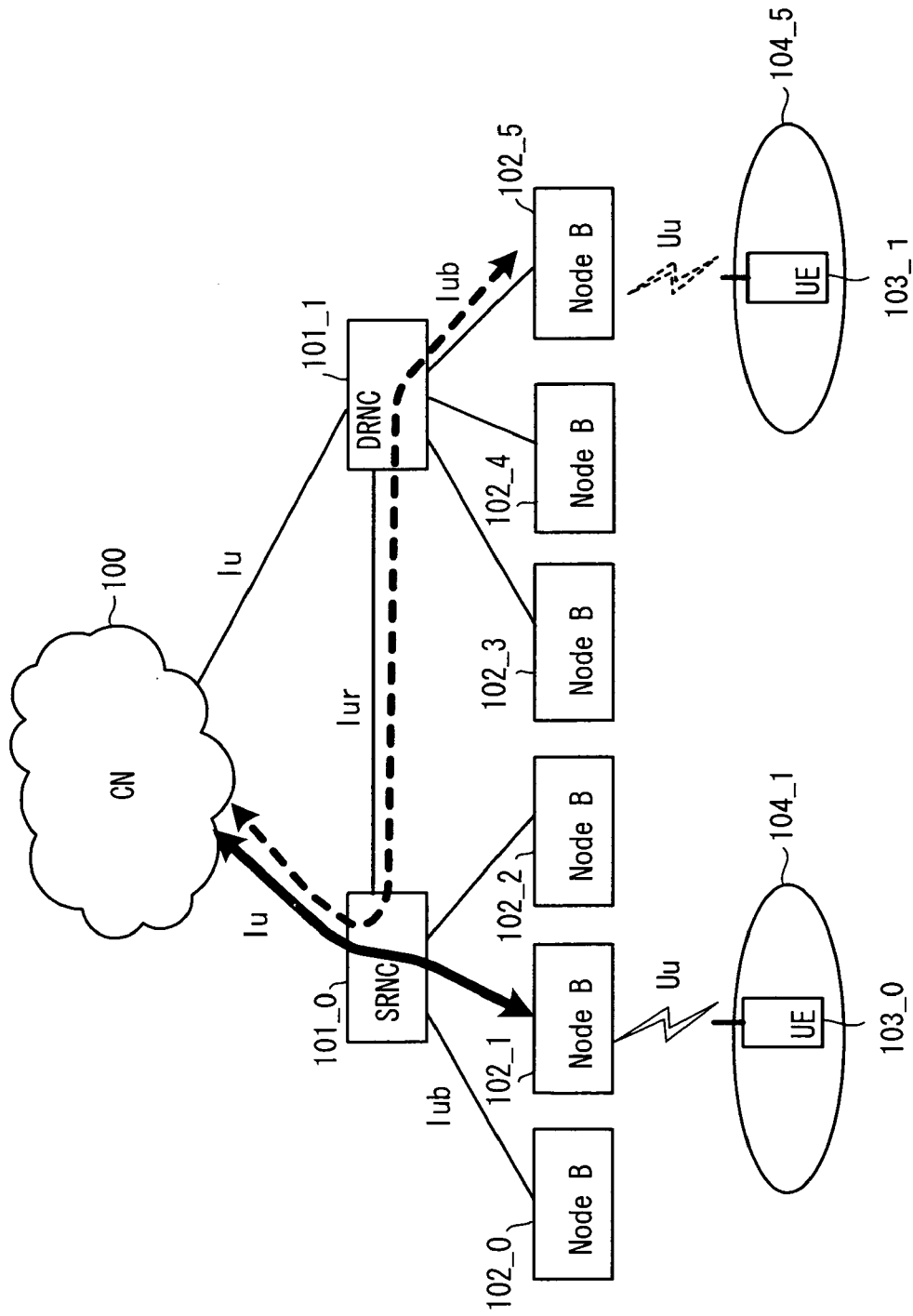
FIG. 19 is an explanatory view illustrating the flow of user data at the time of communication.
Figure 20:
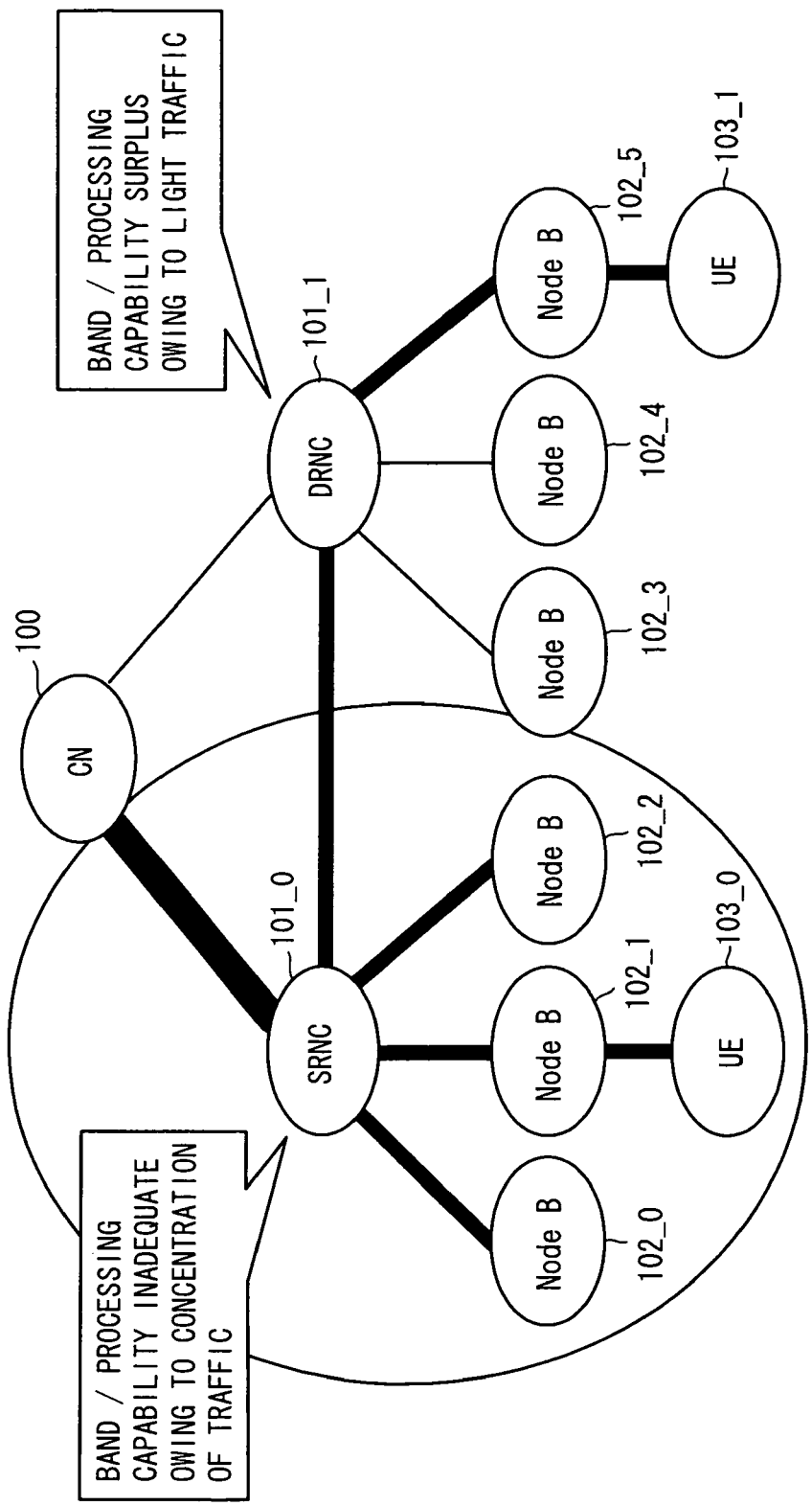
FIG. 20 is a diagram useful in describing the influence of traffic fluctuation upon a system.

(b) The second method handles data as one data stream upon combining all paths PT1, P1, P2, as illustrated in FIG. 17. Specifically, RNCs 101_0, 101_1 on each path only transmit data to the partner node. Further, Node B 102_5 and UE 103 are provided with one retransmission control protocol ARQ.

The Node B 102_5 multiplexes data addressed to the same user, which data is received from respective ones of the paths PT1, P1, P2, into a single data stream and transmits the data to the UE 103 in accordance with the retransmission control protocol. Conversely, the Node B 102_5 receives data from the UE 103 as a single data stream in accordance with the retransmission control protocol and thenceforth disperses and transmits the data to each of the paths PT1, P1, P2. In this case, as viewed from the UE 103, only one protocol is supported, in the same way as before the dispersion of user data to a plurality of transmission paths. As a result, a change in settings owing to the fact that user data has been dispersed is unnecessary.

In accordance with the present invention, it is possible to maintain system stability, raise the efficiency of utilization of the entire system and improve cost performance by dispersing and transmitting user data using a plurality of transmission paths when traffic between a core network and a radio base station increases. Further, in accordance with the present invention, user data and call control signals are separated, distribution processing is applied with regard to the user data and the control signals are terminated by an SRNC. As a result, dispersion processing can be executed and correct call control can be carried out.

Further, in accordance with the present invention, traffic on a transmission path or at a node where traffic has concentrated can be reduced and the amount of reduction can be dispersed to transmission paths or nodes where traffic has not concentrated, thereby enabling communication to continue.

Further, in accordance with the present invention, retransmission control can be carried out and accurate data sent and received even in a case where user data is transmitted upon being dispersed by a plurality of transmission paths.

What is claimed is:

1. A data dispersing method of dispersing data in a mobile communication system having a plurality of radio network controllers and a plurality of radio base stations connected to each of the radio network controllers, for sending and receiving user data between a host network and mobile stations via said radio network controllers and radio base stations, comprising steps of:

setting up a plurality of transmission paths, each of which passes through at least a different radio network controller, between a base station, which sends and receives radio signals to and from a mobile station, and the host network;

when user data is transmitted between the host network and a mobile station, dispersing the user data by passing said user data through said plurality of transmission paths;

monitoring traffic conditions at a radio network controller;

determining, based upon the traffic conditions, whether user data of a call or line being controlled by said radio network controller is to be dispersed by a plurality of transmission paths; and if the user data is to be dispersed, instructing said host network, another radio network controller and said base station in regard to dispersion of said user data.

2. A data dispersing method according to claim 1, wherein if the effect of dispersing user data is unsatisfactory, the radio network controller controlling said call determines, with respect to user data of another call or line, whether dispersion of the user data by a plurality of transmission paths is to be performed again, and if dispersion is to be performed, instructs the host network, another radio network controller and radio base station to perform dispersion of the user data by a plurality of transmission paths.

3. A data dispersing method of dispersing data in a mobile communication system having a plurality of radio network controllers and a plurality of radio base stations connected to each of the radio network controllers, for sending and receiving user data between a host network and mobile stations via said radio network controllers and radio base stations, comprising steps of:

setting up a plurality of transmission paths, each of which passes through at least a different radio network controller, between a base station, which sends and receives radio signals to and from a mobile station, and the host network;

when user data is transmitted between the host network and a mobile station, dispersing the user data by passing said user data through said plurality of transmission paths;

monitoring traffic conditions on a transmission path at one radio network controller on said transmission path;

on the basis of said traffic conditions, said radio network controller requesting another radio network controller, which controls a call on said transmission path, to perform dispersion of the user data by a plurality of transmission paths; and said requested radio network controller exercising control so as to disperse said user data to a plurality of transmission paths.

4. A data dispersing method according to claim 3 wherein if the effect of dispersing user data is unsatisfactory, then the radio network controller that controls a call on said transmission path is requested to distribute the user data again.

5. A data dispersing method according to claim 3 wherein when dispersion of user data by a plurality of transmission paths is requested, a call desired to be dispersed is selected at a requesting node and reported to the radio network controller controlling said call.

6. A data dispersing method according to claim 5, wherein when dispersion of said user data by a plurality of transmission paths is requested, a requesting node calculates amount of band desired to be dispersed, incorporates this amount of band in the dispersion request and gives notification thereof.

7. A data dispersing method according to claim 3 wherein when dispersion of user data by a plurality of transmission paths is requested, a line desired to be dispersed is selected at a requesting node;
said line is reported to a radio network controller controlling calls on said transmission path; and
said radio network controller selects a call to be dispersed from among a plurality of calls contained on said line.

8. A data dispersing method according to claim 7, wherein when dispersion of said user data by a plurality of transmission paths is requested, the requesting node calculates amount of band desired to be dispersed, incorporates this amount of band in the dispersion request and gives notification thereof.

9. A data dispersing method according to claim 3 wherein when dispersion of user data by a plurality of transmission paths is requested, a radio network controller that controls calls on said transmission path is notified only of whether dispersion is desired and the radio network controller so notified selects a call for which user data will be dispersed.

10. A data dispersing method according to claim 9, wherein when dispersion of said user data by a plurality of transmission paths is requested, a requesting node calculates amount of band desired to be dispersed, incorporates this amount of band in the dispersion request and gives notification thereof.

11. A data dispersing method of dispersing data in a mobile communication system having a plurality of radio network controllers and a plurality of radio base stations connected to each of the radio network controllers, for sending and receiving user data between a host network and mobile stations via said radio network controllers and radio base stations, comprising steps of:
setting up a plurality of transmission paths, each of which passes through at least a different radio network controller, between a base station, which sends and receives radio signals to and from a mobile station, and the host network;
when user data is transmitted between the host network and a mobile station, dispersing the user data by passing said user data through said plurality of transmission paths;
monitoring traffic conditions on a transmission path at said base station on said transmission path; and
on the basis of said traffic conditions, said base station requesting a radio network controller, which controls a call on said transmission path, to perform dispersion of the user data by a plurality of transmission paths.

12. A data dispersing method of dispersing data in a mobile communication system having a plurality of radio network controllers and a plurality of radio base stations connected to each of the radio network controllers, for sending and receiving user data between a host network and mobile stations via said radio network controllers and radio base stations, comprising steps of:
setting up a plurality of transmission paths, each of which passes through at least a different radio network controller, between a base station, which sends and receives radio signals to and from a mobile station, and the host network;
when user data is transmitted between the host network and a mobile station, dispersing the user data by passing said user data through said plurality of transmission paths;
monitoring traffic conditions on a transmission path at said host network; and
on the basis of said traffic conditions, said host network requesting a radio network controller, which controls a call on said transmission path, to perform dispersion of the user data by a plurality of transmission paths.

13. A data dispersing method of dispersing data in a mobile communication system having a plurality of radio network controllers and a plurality of radio base stations connected to each of the radio network controllers, for sending and receiving user data between a host network and mobile stations via said radio network controllers and radio base stations, comprising steps of:
setting up a plurality of transmission paths, each of which passes through at least a different radio network controller, between a base station, which sends and receives radio signals to and from a mobile station, and the host network;
when user data is transmitted between the host network and a mobile station, dispersing the user data by passing said user data through said plurality of transmission paths;
terminating user data, which is sent and received to and from the host network via a plurality of transmission paths, transmission path by transmission path by a retransmission control protocol at a radio network controller on each transmission path;
terminating the user data, transmission path by transmission path, by respective ones of a plurality of retransmission control protocols at a mobile station; and
transmitting and receiving the user data as a separate data stream on each transmission path.

14. A data dispersing method of dispersing data in a mobile communication system having a plurality of radio network controllers and a plurality of radio base stations connected to each of the radio network controllers, for sending and receiving user data between a host network and mobile stations via said radio network controllers and radio base stations, comprising steps of:
setting up a plurality of transmission paths, each of which passes through at least a different radio network controller, between a base station, which sends and receives radio signals to and from a mobile station, and the host network;
when user data is transmitted between the host network and a mobile station, dispersing the user data by passing said user data through said plurality of transmission paths;
multiplexing user data, which is dispersed and transmitted from the host network via a plurality of transmission paths, at a radio base station and terminating the user data by a single retransmission control protocol;
terminating the user data by a single retransmission control protocol also at a mobile station;
performing communication as a single data stream upon combining all transmission paths; and
terminating user data, which has been received from a mobile station, by the retransmission protocol at a radio base station, and dispersing and transmitting the user data to a plurality of transmission paths.

* * * * *

UNITED STATES PATENT AND TRADEMARK OFFICE
CERTIFICATE OF CORRECTION

| | |
|---|---|
| PATENT NO. | : 7,613,149 B2 |
| APPLICATION NO. | : 11/143924 |
| DATED | : November 3, 2009 |
| INVENTOR(S) | : Tomita et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 997 days.

Signed and Sealed this

Nineteenth Day of October, 2010

David J. Kappos
*Director of the United States Patent and Trademark Office*